US011206117B2

(12) United States Patent
Seo et al.

(10) Patent No.: US 11,206,117 B2
(45) Date of Patent: Dec. 21, 2021

(54) METHOD FOR TRANSMITTING OR RECEIVING SIGNAL IN WIRELESS COMMUNICATION SYSTEM AND DEVICE THEREFOR

(71) Applicant: LG Electronics Inc., Seoul (KR)

(72) Inventors: Inkwon Seo, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 94 days.

(21) Appl. No.: 16/645,309

(22) PCT Filed: Sep. 10, 2018

(86) PCT No.: PCT/KR2018/010545
§ 371 (c)(1),
(2) Date: Mar. 6, 2020

(87) PCT Pub. No.: WO2019/050357
PCT Pub. Date: Mar. 14, 2019

(65) Prior Publication Data
US 2021/0314114 A1    Oct. 7, 2021

Related U.S. Application Data

(60) Provisional application No. 62/564,208, filed on Sep. 27, 2017, provisional application No. 62/563,092,
(Continued)

(51) Int. Cl.
*H04L 5/00* (2006.01)
*H04L 1/00* (2006.01)

(52) U.S. Cl.
CPC .......... *H04L 5/0048* (2013.01); *H04L 1/0071* (2013.01)

(58) Field of Classification Search
CPC ........................... H04L 5/0048; H04L 1/0071
See application file for complete search history.

(56) References Cited

U.S. PATENT DOCUMENTS

2018/0324770 A1* 11/2018 Nogami ................... H04L 5/005
2018/0359755 A1* 12/2018 Sun ........................ H04L 5/0053
(Continued)

OTHER PUBLICATIONS

InterDigital Inc., "On the impact of multi-beam operation on PDCCH structure," R1-1714148, 3GPP TSG RAN WG1 Meeting #90, Prague, Czech Republic, dated Aug. 21-25, 2017, 5 pages.
(Continued)

*Primary Examiner* — Duc C Ho
(74) *Attorney, Agent, or Firm* — Fish & Richardson P.C.

(57) ABSTRACT

A method by a terminal includes: receiving configuration information for each of CORESETs; mapping each CCE of a control channel candidate to at least one REG bundle by interleaving on a first CORESET; and attempting detection of downlink control information of the terminal from the control channel candidate based on the mapping between each CCE and the REG bundle. When the first CORESET overlaps a second CORESET and an aggregation level of the control channel candidate is 2 or greater, the terminal performs interleaving so that at least one REG bundle of a first CCE configuring the control channel candidate and at least one REG bundle of a second CCE are consecutive to each other in the frequency domain. The UE is capable of communicating with at least one of another UE, a UE related to an autonomous driving vehicle, a base station or a network.

17 Claims, 21 Drawing Sheets

Related U.S. Application Data filed on Sep. 26, 2017, provisional application No. 62/559,613, filed on Sep. 17, 2017, provisional application No. 62/556,320, filed on Sep. 8, 2017.

(56) References Cited

U.S. PATENT DOCUMENTS

| | | | |
|---|---|---|---|
| 2018/0368116 A1* | 12/2018 | Liao | H04L 5/0053 |
| 2020/0021419 A1* | 1/2020 | Taherzadeh Boroujeni | H04L 5/0091 |
| 2020/0092855 A1* | 3/2020 | Seo | H04W 72/042 |

OTHER PUBLICATIONS

LG Electronics, "Discussion on CORESET configuration," R1-1713166, 3GPP TSG RAN WG1 Meeting #90, Prague, Czech Republic, dated Aug. 21-25, 2017, 7 pages.

LG Electronics, "Discussion on NR-PDCCH structure," R1-1713164, 3GPP TSG RAN WG1 Meeting #90, Prague, Czech Republic, dated Aug. 21-25, 2017, 6 pages.

PCT International Search Report in International Application No. PCT/KR2018/010545, dated Feb. 12, 2019, 22 pages (with English translation).

Qualcomm Incorporated, "Nested search space design," R1-1713419, 3GPP TSG RAN WG1 #90, Prague, Czech Republic, dated Aug. 21-25, 2017, 8 pages.

Vivo, "Discussion on REG bundling size and CCE-REG mapping," R1-1712844, 3GPP TSG RAN WG1 Meeting #90, Prague, Czech Republic, dated Aug. 21-15, 2017, 8 pages.

Vivo, "Remaining issues for CORESET configuration," R1-1714584, 3GPP TSG RAN WG1 Meeting #90, Prague, Czech Republic, dated Aug. 21-25, 2017, 4 pages.

* cited by examiner

METHOD FOR TRANSMITTING OR RECEIVING SIGNAL IN WIRELESS COMMUNICATION SYSTEM AND DEVICE THEREFOR

CROSS-REFERENCE TO RELATED APPLICATIONS

This application is a National Stage application under 35 U.S.C. § 371 of International Application No. PCT/KR2018/010545, filed on Sep. 10, 2018, which claims the benefit of U.S. Provisional Application No. 62/564,208, filed on Sep. 27, 2017, U.S. Provisional Application No. 62/563,092, filed on Sep. 26, 2017, U.S. Provisional Application No. 62/559,613, filed on Sep. 17, 2017, and U.S. Provisional Application No. 62/556,320, filed on Sep. 8, 2017. The disclosures of the prior applications are incorporated by reference in their entirety.

TECHNICAL FIELD

The present disclosure relates to a wireless communication system and, more particularly, to a method of transmitting or receiving a downlink control channel signal by a base station or a user equipment in a wireless communication system, and an apparatus therefor.

BACKGROUND ART

First, the existing 3GPP LTE/LTE-A system will be briefly described. Referring to FIG. 1, the UE performs an initial cell search (S101). In the initial cell search process, the UE receives a Primary Synchronization Channel (P-SCH) and a Secondary Synchronization Channel (S-SCH) from a base station, performs downlink synchronization with the BS, and acquires information such as a cell ID. Thereafter, the UE acquires system information (e.g., MIB) through a PBCH (Physical Broadcast Channel). The UE may receive the DL RS (Downlink Reference Signal) and check the downlink channel status.

After the initial cell search, the UE may acquire more detailed system information (e.g., SIBs) by receiving a Physical Downlink Control Channel (PDCCH) and a Physical Downlink Control Channel (PDSCH) scheduled by the PDCCH (S102).

The UE may perform a random access procedure for uplink synchronization. The UE transmits a preamble (e.g., Msg1) through a physical random access channel (PRACH) (S103), and receives a response message (e.g., Msg2) for the preamble through PDCCH and PDSCH corresponding to the PDCCH. In the case of a contention-based random access, a contention resolution procedure such as additional PRACH transmission (S105) and PDCCH/PDSCH reception (S106) may be performed.

Then, the UE may perform PDCCH/PDSCH reception (S107) and Physical Uplink Shared Channel (PUSCH)/Physical Uplink Control Channel (PUCCH) transmission (S108) as a general uplink/downlink signal transmission procedure. The UE may transmit UCI (Uplink Control Information) to the BS. The UCI may include HARQ ACK/NACK (Hybrid Automatic Repeat reQuest Acknowledgment/Negative ACK), SR (Scheduling Request), CQI (Channel Quality Indicator), PMI (Precoding Matrix Indicator) and/or RI etc.

DETAILED DESCRIPTION OF THE DISCLOSURE

Technical Problems

An object of the present disclosure is to provide a method of efficiently transmitting and receiving downlink control information when two or more control resource sets (CORESETs) are configured for one UE, and an apparatus therefor.

The objects of the present disclosure are not limited to what has been particularly described hereinabove and other objects may be derived from embodiments of the present disclosure.

Technical Solutions

According to an aspect of the present disclosure, provided herein is a method of receiving a downlink signal by a user equipment (UE) in a wireless communication system, including receiving configuration information regarding each of a plurality of control resource sets (CORESETs) from a base station (BS); mapping each control channel element (CCE) of a control channel candidate to at least one resource element group (REG) bundle by performing interleaving on a first CORESET among the plural CORESETs; and attempting to detect downlink control information of the UE from the control channel candidate based on mapping between each CCE and the at least one REG bundle, wherein, based on overlap between the first CORESET on which interleaving is performed and a second CORESET among the plural CORESETs and an aggregation level of the control channel candidate greater than 2 or more, the UE performs interleaving to cause at least one REG bundle of a first CCE among different CCEs constituting the control channel candidate and at least one REG bundle of a second CCE among the different CCEs to be contiguous in the frequency domain.

In another aspect of the present disclosure, provided herein is a user equipment (UE) for receiving a downlink signal, including a transceiver; and a processor configured to receive configuration information regarding each of a plurality of control resource sets (CORESETs) from a base station (BS) through the transceiver, map each control channel element (CCE) of a control channel candidate to at least one resource element group (REG) bundle by performing interleaving on a first CORESET among the plural CORESETs, and attempt to detect downlink control information of the UE from the control channel candidate based on mapping between each CCE and the at least one REG bundle, wherein, based on overlap between the first CORESET on which interleaving is performed and a second CORESET among the plural CORESETs and an aggregation level of the control channel candidate greater than 2 or more, the processor performs interleaving to cause at least one REG bundle of a first CCE among different CCEs constituting the control channel candidate and at least one REG bundle of a second CCE among the different CCEs to be contiguous in the frequency domain.

In another aspect of the present disclosure, provided herein is a method of transmitting a downlink signal by a base station (BS) in a wireless communication system, including transmitting configuration information regarding each of a plurality of control resource sets (CORESETs) to a user equipment (UE); mapping each control channel element (CCE) of a control channel candidate to at least one resource element group (REG) bundle by performing interleaving on a first CORESET among the plural CORESETs;

and transmitting downlink control information of the UE on the control channel candidate based on mapping between each CCE and the at least one REG bundle, wherein, based on overlap between the first CORESET on which interleaving is performed and a second CORESET among the plural CORESETs and an aggregation level of the control channel candidate greater than 2 or more, the BS performs interleaving to cause at least one REG bundle of a first CCE among different CCEs constituting the control channel candidate and at least one REG bundle of a second CCE among the different CCEs to be contiguous in the frequency domain.

In another aspect of the present disclosure, provided herein is a base station (BS) for performing the above-described method of transmitting a downlink signal.

The UE or the BS may group the different CCEs into a plurality of CCE groups and then perform REG bundle level interleaving for each of the plural CCE groups, and perform comb-combining of alternately combining a result of the REG bundle level interleaving with respect to the CCE groups. The first CCE and the second CCE may belong to different CCE groups, and the REG bundle level interleaving may be performed through a sub-block interleaver. The number of the plural CCE groups may be included in configuration information regarding the first CORESET or may be determined based on aggregation levels configured for the first CORESET.

The UE or the BS may group REG bundles included in the first CORESET into a plurality of REG bundle sets and then interleave the plural REG bundle sets at an REG bundle set level.

The size of one REG bundle set may be included in configuration information regarding the first CORESET or may be determined based on aggregation levels configured for the first CORESET.

The UE or the BS may extract all REG bundles included in one REG bundle set only from even-numbered CCEs or only from odd-numbered CCEs.

The UE or the BS may perform interleaving through two block interleavers connected serially, a first block interleaver of the two block interleavers may interleave the REG bundles included in the first CORESET to output the plural REG bundle sets, and a second block interleaver of the two block interleavers may interleave the plural REG bundle sets at the REG bundle set level.

The UE or the BS may divide the first CORESET into a plurality of sub-CORESETs and perform interleaving for each of the plural sub-CORESETs.

The configuration information regarding each of the plural CORESETs may further include information about an aggregation level set to be applied to a corresponding CORESET, and one of aggregation level sets {1, 2, 4, 8}, {1, 2, 4, 8, 16}, {1, 3, 6, 12}, and {1, 3, 6, 12, 24} may be configured for the first CORESET.

Advantageous Effects

According to an embodiment of the present disclosure, since blocking between CORESETs is minimized through interleaving even when different CORESETs configured for a UE overlap, a problem of disabling use of radio resources needed to transmit downlink control information may be solved and frequency diversity gain may be acquired due to interleaving.

The effects of the present disclosure are not limited to what has been particularly described hereinabove and other effects may be derived from embodiments of the present disclosure.

BEST MODE FOR CARRYING OUT THE DISCLOSURE

Figure 1:
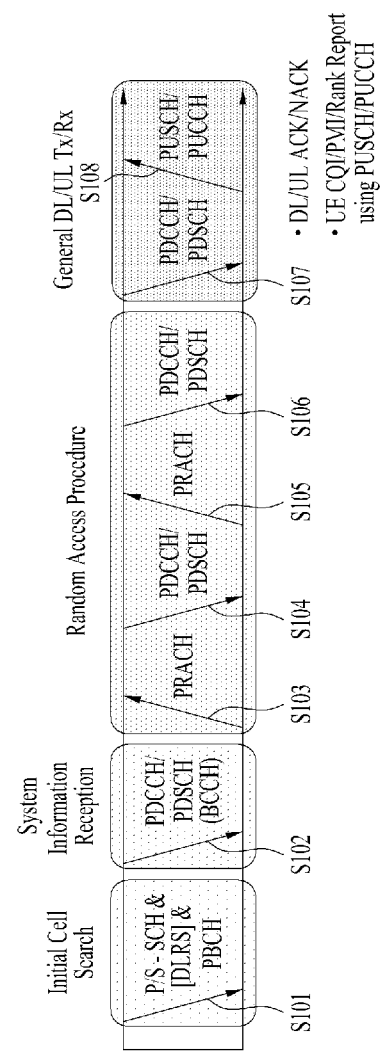
FIG. 1 illustrates physical channels used in 3GPP LTE/LTE-A system and a general signal transmission method using the physical channels.

The following description of embodiments of the present disclosure may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA may be implemented with such a radio technology as UTRA (universal terrestrial radio access), CDMA 2000 and the like. TDMA may be implemented with such a radio technology as GSM/GPRS/EDGE (Global System for Mobile communications)/General Packet Radio Service/Enhanced Data Rates for GSM Evolution). OFDMA may be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present disclosure may be non-limited. Specific terminologies used in the following description are provided to help understand the present disclosure and the use of the terminologies may be modified to a different form within a scope of the technical idea of the present disclosure.

As many as possible communication devices have demanded as high as communication capacity and, thus, there has been a need for enhanced mobile broadband (eMBB) communication compared with legacy radio access technology (RAT) in a recently discussed next-generation communication system. In addition, massive machine type communications (mMTC) for connecting a plurality of devices and objects to provide various services anytime and anywhere is also one of factors to be considered in next-generation communication. In addition, in consideration of a service/UE that is sensitive to reliability and latency, ultra-reliable and low latency communication (URLLC) has been discussed for a next-generation communication system.

As such, new RAT that considers eMBB, mMTC, URLCC, and so on has been discussed for next-generation wireless communication.

Some LTE/LTE-A operations and configuration that are not at variance to a design of New RAT may also be applied to new RAT. For convenience, new RAT may be referred to as 5G mobile communication.

<NR Frame Structure and Physical Resource>

In an NR system, downlink (DL) and uplink (UL) transmission may be performed through frames having duration of 10 ms and each frame may include 10 subframes. Accordingly, 1 subframe may correspond to 1 ms. Each frame may be divided into two half-frames.

1 subframe may include $N_{symb}^{subframe,\mu} = N_{symb}^{slot} \times N_{subframe,\mu}$ contiguous OFDM symbols. $N_{symb}^{slot}$ represents the number of symbols per slot, $\mu$ represents OFDM numerology, and $N_{subframe,\mu}$ represents the number of slots per subframe with respect to corresponding $\mu$. In NR, multiple OFDM numerologies shown in Table 1 below may be supported.

TABLE 1

| $\mu$ | $\Delta f = 2^{\mu} \cdot 15[kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 210 | Normal |

In Table 1 above, $\Delta f$ refers to subcarrier spacing (SCS). $\mu$ and cyclic prefix with respect to a DL carrier bandwidth part (BWP) and $\mu$ and cyclic prefix with respect to a UL carrier BWP may be configured for a UE via UL signaling.

Table 2 below shows the number of $N_{symb}^{slot}$ of symbols per slot, the number $N_{slot}^{frame,\mu}$ of symbols per frame, and the number $N_{slot}^{subframe,\mu}$ of slots per subframe with respect to each SCS in the case of normal CP.

TABLE 2

| $\mu$ | $N_{symb}^{slot}$ | $N_{slot}^{frame,\mu}$ | $N_{slot}^{subframe,\mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Table 3 below shows the number $N_{symb}^{slot}$ of symbols per slot, the number $N_{slot}^{frame,\mu}$ of slots per frame, and the number $N_{slot}^{subframe,\mu}$ of slots per subframe with respect to each SCS in the case of extended CP.

TABLE 3

| $\mu$ | $N_{symb}^{slot}$ | $N_{slot}^{frame,\mu}$ | $N_{slot}^{subframe,\mu}$ |
| --- | --- | --- | --- |
| 2 | 12 | 40 | 4 |

As such, in an NR system, the number of slots included in 1 subframe may be changed according to subcarrier spacing (SCS). OFDM symbols included in each slot may correspond to any one of D (DL), U (UL), and X (flexible). DL transmission may be performed in a D or X symbol and UL transmission may be performed in a U or X symbol. A Flexible resource (e.g., X symbol) may also be referred to as a Reserved resource, an Other resource, or a Unknown resource.

In NR, one resource block (RB) may correspond to 12 subcarriers in the frequency domain. A RB may include a plurality of OFDM symbols. A resource element (RE) may correspond to 1 subcarrier and 1 OFDM symbol. Accordingly, 12 REs may be present on 1 OFDM symbol in 1 RB.

A carrier BWP may be defined as a set of contiguous physical resource blocks (PRBs). The carrier BWP may also be simply referred to as a BWP. A maximum of 4 BWPs may be configured for each of UL/DL link in 1 UE. Even if multiple BWPs are configured, 1 BWP may be activated for a given time period. However, when a supplementary uplink (SUL) is configured in a UE, 4 BWPs may be additionally configured for the SUL and 1 BWP may be activated for a given time period. A UE may not be expected to receive a PDSCH, a PDCCH, a channel state information—reference signal (CSI-RS), or a tracking reference signal (TRS) out of the activated DL BWP. In addition, the UE may not be expected to receive a PUSCH or a PUCCH out of the activated UL BWP.

<NR DL Control Channel>

In an NR system, a transmissions NR system, a transmission unit of a control channel may be defined as a resource element group (REG) and/or a control channel element (CCE), etc. The CCE may refer to a minimum unit for control channel transmission. That is, a minimum PDCCH size may correspond to 1 CCE. When an aggregation level is equal to or greater than 2, a network may group a plurality of CCEs to transmit one PDCCH (i.e., CCE aggregation).

An REG may correspond to 1 OFDM symbol in the time domain and may correspond to 1 PRB in the frequency domain. In addition, 1 CCE may correspond to 6 REGs.

A control resource set (CORESET) and a search space (SS) are briefly described now. The CORESET may be a set of resources for control signal transmission and the search space may be aggregation of control channel candidates for perform blind detection. The search space may be configured for the CORESET. For example, when one search space is defined on one CORESET, a CORESET for a common search space (CSS) and a CORESET for a UE-specific search space (USS) may each be configured. As another example, a plurality of search spaces may be defined in one CORESET. For example, the CSS and the USS may be configured for the same CORESET. In the following example, the CSS may refer to a CORESET with a CSS configured therefor and the USS may refer to a CORESET with a USS configured therefor, or the like.

A base station may signal information on a CORESET to a user equipment (UE). For example, a CORESET configuration is signaled to a UE for each CORESET. The CORESET configuration may include time duration of a CORESET (e.g., 1/2/3 symbols), a frequency domain resource of the CORESET, a precoder granularity, an REG-to-CCE mapping type (e.g., interleaved/non-interleaved), in case of the interleaved REG-to-CCE mapping type, an REG bundling size, an interleaver size, and the like.

If REG-to-CCE mapping for 1-symbol CORESET corresponds to the non-interleaved type, 6 REGs for CCE are grouped as a single REG bundle and the REGs for the CCE are consecutive. If there are multiple CCEs within 1 PDCCH (e.g., when an aggregation level is equal to or greater than 2), the CCEs may be consecutive. A UE may assume the same precoding within 1 REG bundle according to a precoder granularity or assume the same precoding for a plurality of REG bundles.

If REG-to-CCE mapping for 1-symbol CORESET corresponds to the interleaved type, 2, 3, or 6 REGs may be configured as 1 REG bundle. For example, it may be able to support such an REG bundle size as {2}, {3}, {2,3}, {2,6}, {3,6}, or {2,3,6} as a subset rather than support all REG bundle sizes of 2, 3, and 6. In case of supporting an REG bundle size of {2,6}, 1 REG bundle may be configured by 2 REGs or 6 REGs. A UE may assume the same precoding within 1 REG bundle or assume the same precoding for a plurality of REGs.

When REG-to-CCE mapping is performed on a CORESET having duration equal to or longer than 2 symbols, it may define an REG bundle in time/frequency domain. If an REG bundle is defined in time domain, all REGs belonging to 1 REG bundle belong to the same RB and the REGs may correspond to symbols different from each other. If an REG bundle is defined in time-frequency domain, 1 REG bundle belongs to the same RB and may include not only REGs corresponding to symbols different from each other but also REGs belonging to a different RB.

When REG-to-CCE mapping is performed on a CORESET having duration equal to or longer than 2 symbols, it may be able to support time-first mapping to the REG-to-CCE mapping. An REG bundle may be configured to be identical to time domain duration of a CORESET in time domain. In case of the non-interleaved type, 6 REGs constructing a CCE may correspond to 1 REG bundle and the REGS of the CCE may be localized in time/frequency domain. In case of the interleaved type, 2, 3, or 6 REGs may correspond to 1 REG bundle and REG bundles may be interleaved within a CORESET. A UE may assume the same precoding within 1 REG bundle according to a precoder granularity or assume the same precoding for a plurality of REG bundles.

<Blocking Issue and Interleaving Function>

In NR, the CORESET may be defined as a resource region in which resource indexing for control channel transmission and reception is performed. A plurality of CORESETs may be configured for one UE and different CORESETs may overlap in the time/frequency domain. Allowing overlap between CORESETs is advantageous in that resources may be more efficiently used but may generate a blocking issue between different CORESETs in an overlapping region.

Figure 2:
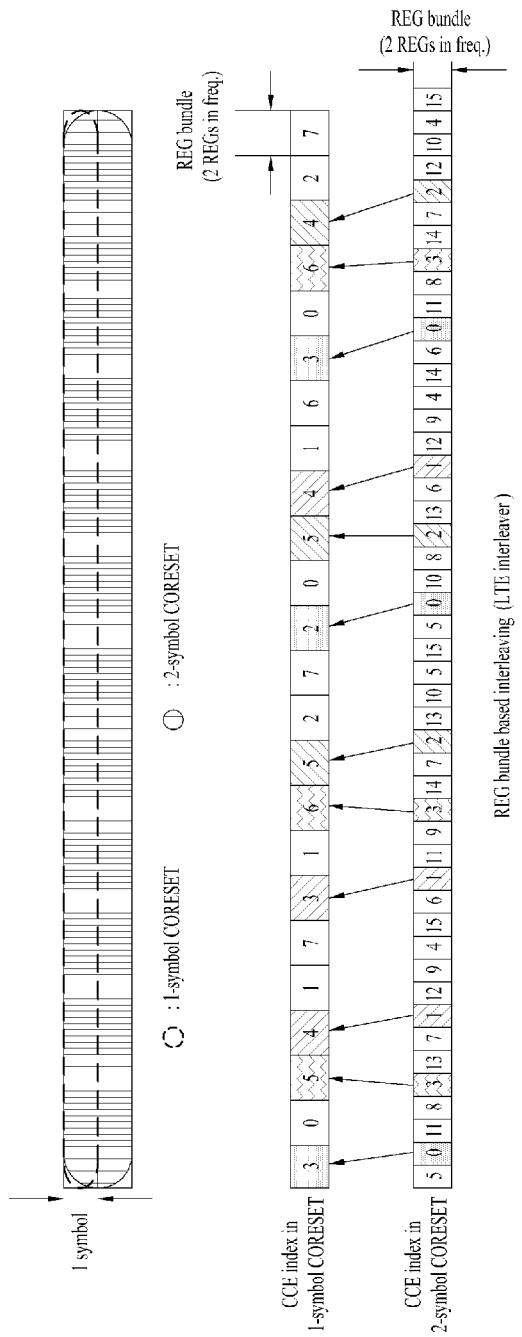
FIG. 2 illustrates an example of overlap between a 1-symbol CORESET and a 2-symbol CORESET.

FIG. 2 illustrates an example of overlap between a 1-symbol CORESET and a 2-symbol CORESET in a 1-symbol CORESET region.

In FIG. 2, it is assumed that REG bundling is performed in units of 2 REGs in the frequency domain for the 1-symbol CORESET. It is assumed that REG bundling is performed in units of 2 REGs in the time domain for the 2-symbol CORESET. If REG bundling is performed, this may mean that the UE may assume the same precoding for REGs in an REG bundle. In each CORESET, REG bundles are distributed using interleaving (e.g., a sub-block interleaving scheme of the LTE specification TS 36.212) in units of REG bundles.

As may be seen in FIG. 2, when CCE #0 in the 2-symbol CORESET is used to transmit a control channel, CCE #2 and CCE #3 in the 1-symbol CORESET may not be used. In addition to resources occupied by CCE #0 of the 2-symbol CORESET, 3 REG bundles are additionally wasted in the 1-symbol CORESET. For example, although the corresponding REG bundles in the 1-symbol CORESET do not directly overlap with CCE #0 in the 2-symbol CORESET, the bundles may not be used if the bundles belong to CCE #2 and CCE #3.

When a candidate of aggregation level (AL) 8 is transmitted in the 2-symbol CORESET, available CCEs in the 1-symbol CORESET are only CCE #0 and CCE #1.

This may be defined as blocking for the 1-symbol CORESET by the 2-symbol CORESET. Such blocking may occur in the opposite case, for example, when PDCCH transmission is performed in the 1-symbol CORESET and thus a plurality of resources may not be used in the 2-symbol CORESET.

An embodiment of the present disclosure proposes an interleaving scheme for solving a blocking issue in a CORESET overlapping situation. According to a proposed interleaver structure, when multiple CORESETs having different bundle sizes in the frequency domain overlap, a method of forming a plurality of CCE groups (in the logical domain) and performing distribution using the same interleaving function for REG bundles in each CCE group in order to minimize blocking of a CORESET having a small bundle size in the frequency domain (e.g., the 2-symbol CORESET in FIG. 2) is proposed. To this end, a CCE grouping method is proposed.

Figure 3:
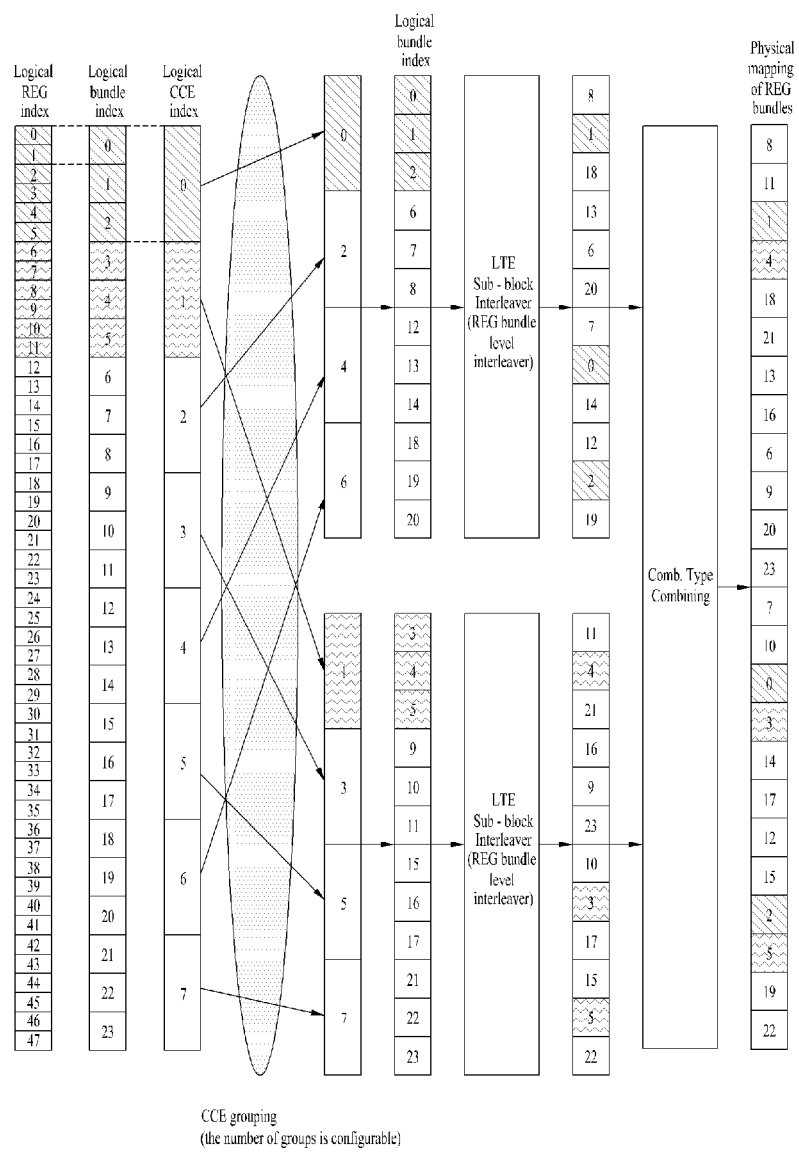
FIG. 3 illustrates an interleaving structure according to an embodiment of the present disclosure.

FIG. 3 illustrates an interleaving structure according to an embodiment of the present disclosure.

In FIG. 3, it is assumed that 48 REGs are present in a 1-symbol CORESET and an REG bundle size is 2. However, the same method may be applied to other CORESET sizes and bundle sizes.

A method of determining REG indexes in the logical domain will now be described. The number of REGs may be determined according to the number of resources available in a corresponding CORESET and REG indexing may be performed on the determined number of REGs. A logical REG bundle index may mean that REGs are bundled into REG bundles according to a bundle size in the corresponding CORESET and then the REG bundles are indexed. The logical domain may be referred to as the virtual domain. For example, a logical REG/REG bundle/CCE may be referred to as a virtual REG/REG bundle/CCE.

For example, the number of REG bundles in a specific CORESET may be a value obtained by dividing the number of REGs included in the CORESET by the REG bundle size. Since the number of REGs per CCE is fixed to 6, if the REG bundle size is known, the number of REG bundles included in one CCE may be obtained. Therefore, CCE indexing may be performed based on REG bundle indexes.

Figure 4:
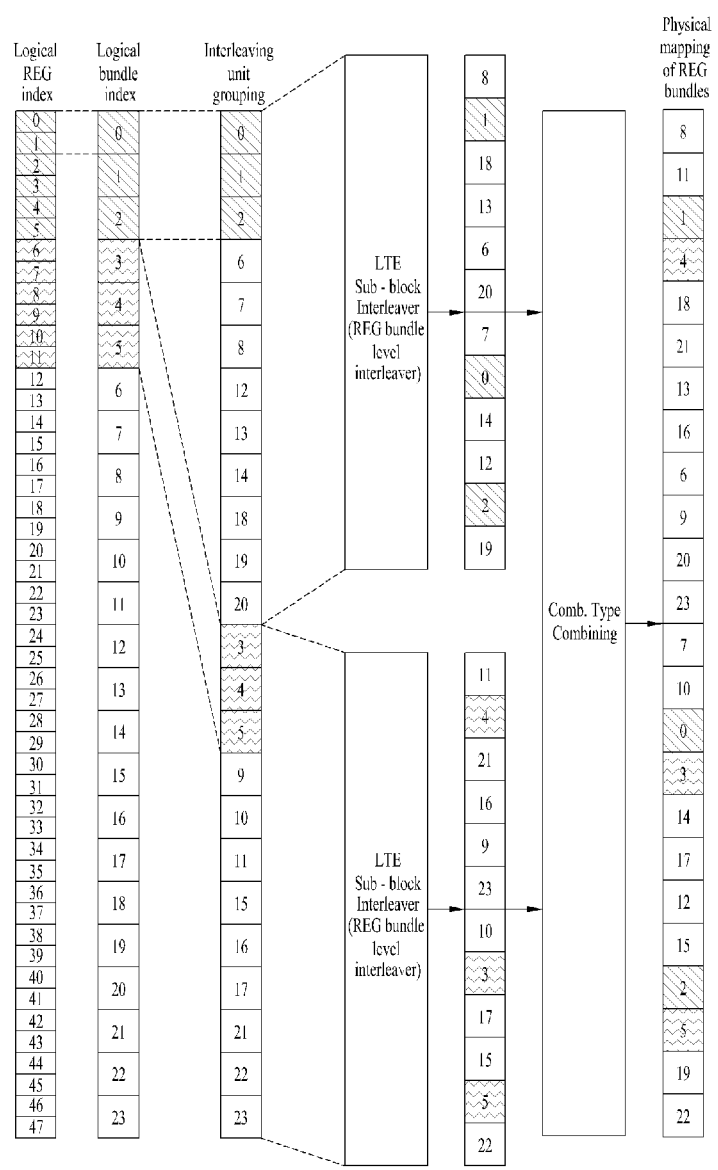
FIG. 4 is a diagram for explaining grouping for logical REG bundles according to an embodiment of the present disclosure.

Hereinbelow, a CCE grouping method is proposed to reduce blocking due to overlap between CORESETs. The CCE grouping method may be implemented by grouping CCEs at an REG bundle level. For example, grouping for logical CCEs may be replaced with grouping for logical REG bundles. FIG. 4 illustrates the case of performing grouping for logical REG bundles.

After performing REG bundle level interleaving, CCE grouping may be used to contiguously arrange REG bundles belonging to different CCEs constituting a high-AL candidate. In addition, CCE grouping may be used to align resource unit boundaries in the frequency domain between candidates of different CORESETs. For example, when an interleaved CORESET and a non-interleaved CORESET overlap, CCE grouping may be used to align CCEs between the two CORESETs or boundaries of candidates. A network may provide the UE with the number of CCE (or REG bundle set) groups per CORESET through higher layer signaling. Alternatively, the number of CCE (or REG bundle set) groups per CORESET may be included in a CORESET configuration.

Upon receiving the number of CCE groups from the network, the UE may derive logical CCE indexes included in each CCE group, for example, as indicated in Equation 1 below. In Equation 1, N denotes the number of CCE groups indicated by the network and an index % N denotes the remainder when an index is divided by N.

In FIG. 3, the number of CCE groups is assumed to be 2, and there are a group of even-numbered CCEs #0, 2, 4 and 6 and a group of odd-numbered CCEs #1, 3, 5 and 7. REG bundles of each CCE group may be interleaved by the same interleaving function. Thereafter, interleaving results of different CCE groups may be comb-combined (e.g., alternately map REG bundles for the respective CCE groups), so that physical REG bundle mapping may be derived.

When the scheme as illustrated in FIG. 3 is used, REG bundles from two CCEs constituting an AL-2 candidate are sequentially arranged in a final physical REG bundle map. For example, assuming that the AL-2 candidate consists of CCE 0 and CCE 1, REG bundle 1 belonging to CCE 0 and REG bundle 4 belonging to CCE 1 are contiguously arranged, and REG bundle 0 belonging to CCE 0 and REG bundle 3 belonging to CCE 1 are contiguously arranged. In addition, REG bundle 2 belonging to CCE 0 and REG bundle 5 belonging to CCE 1 are contiguously arranged.

The number of CCE groups may indicate the number of CCEs that the network intends to contiguously arrange. For example, if the number of CCE groups is 3, 3 REG bundles included respectively in three contiguous CCEs (e.g., CCEs having contiguous indexes) are contiguously arranged in physical mapping. FIG. 4 illustrates an embodiment in which CCE grouping of FIG. 3 is replaced with an REG bundle group.

Figure 5:
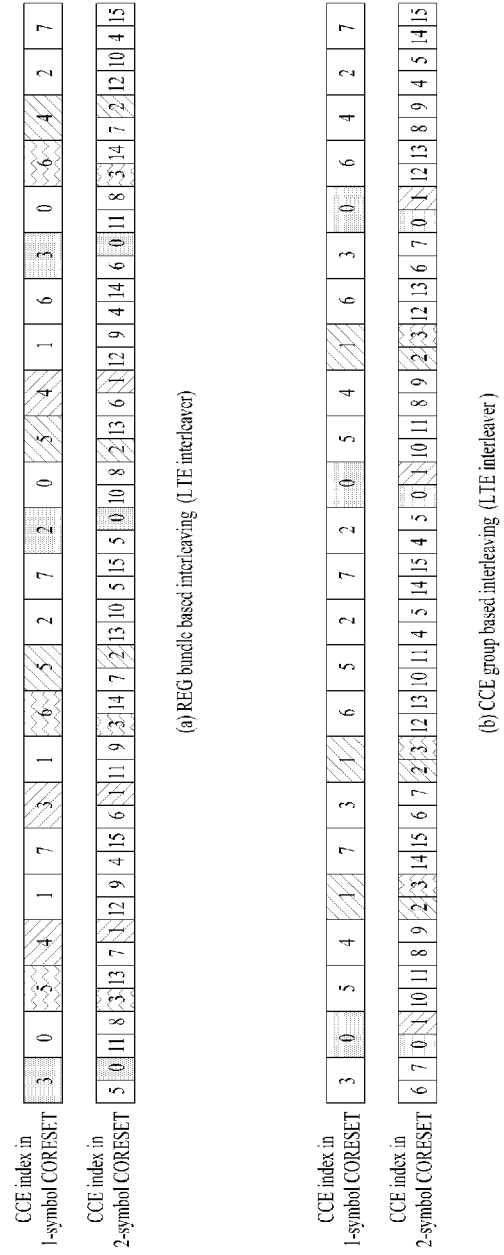
FIG. 5 illustrates a result of applying interleaving according to an embodiment of the present disclosure to a CORESET overlap situation as illustrated in FIG. 2.

FIG. 5 illustrates a result of applying interleaving according to an embodiment of the present disclosure to a CORESET overlapping situation as illustrated in FIG. 2.

In FIG. 5, (b) illustrates a scheme using interleaving and comb-combining after CCE grouping and (a) illustrates the case in which only REG bundle level interleaving is applied to all REG bundles.

Table 4 illustrates comparison of blocking for (a) and (b) of FIG. 5. (In the table, the number of CCEs of a 1-symbol CORESET blocked by one candidate of each AL of a 2-symbol CORESET.)

TABLE 4

| 2-symbol CORESET Candidate | REG Bundle Level interleaving only | CCE Grouping & interleaving & comb-combining |
|---|---|---|
| AL1 Candidate (CCE #0) | Blocking of 2 CCEs (#2 and #3) of 1-symbol CORESET | Blocking of one CCE (#0) of 1-symbol CORESET |
| AL2 Candidate (CCEs #0 and #1) | Blocking of 3 CCEs (#2, #3, and #4) of 1-symbol CORESET | Blocking of one CCE (#0) of 1-symbol CORESET |
| AL4 Candidate (CCEs #0, #1, #2, and #3) | Blocking of 5 CCEs (#2, #3, #4, #5, and #6) of 1-symbol CORESET | Blocking of 2 CCEs (#0 and #1) of 1-symbol CORESET |
| AL8 Candidate (CCEs #0 to #7) | Blocking of 6 CCEs (#2, #3, #4, #5, #6, and #7) of 1-symbol CORESET | Blocking of 4 CCEs (#0, #1, #2, and #3) of 1-symbol CORESET |

CCE group #0=CCE indexes satisfying (CCE index % N=0)

CCE group #1=CCE indexes satisfying (CCE index % N=1)

CCE group #(N−1)=CCE indexes satisfying (CCE index % N=N−1)  [Equation 1]

The UE may perform (logical) CCE grouping as indicated in Equation 1.

Next, interleaving may be performed for physical mapping for logical REG bundles belonging to each CCE group. In FIG. 3, it is assumed that a sub-block interleaver of legacy LTE is used. However, other interleaving functions may be applied to the present disclosure.

As may be seen from Table 4, according to the scheme of (b) of FIG. 5, the number of CCEs of the 1-symbol CORESET blocked by each AL candidate of the 2-symbol CORESET is significantly reduced as compared with (a) of FIG. 5.

Although it has been proposed to signal the number of CCE groups (by being included in a CORESET configuration, etc.), the number of CCE groups may be implicitly determined. For example, the number of CCE groups may be determined in association with an AL of a corresponding CORESET. As an example, the network/UE may set the number of CCE groups in a CORESET to which ALs {1, 2, 4, 8} are applied to 2 and the number of CCE groups in a CORESET to which ALs {1, 3, 6, 12} are applied to 3.

In an embodiment of FIG. 3, the same interleaver is applied to all CCE groups and REGs of different CCEs constituting a candidate of a high AL are contiguously arranged through a comb-type interleaver.

According to another embodiment of the present disclosure, the same result as the embodiment of FIG. 3 may be obtained by defining an REG bundle set and using one interleaver of an REG bundle set unit. The REG bundle set may be defined as a resource unit grouping REG bundles that the network desires to contiguously arrange in physical mapping. The network may reduce a blocking probability through REG bundle set based interleaving.

Figure 6:
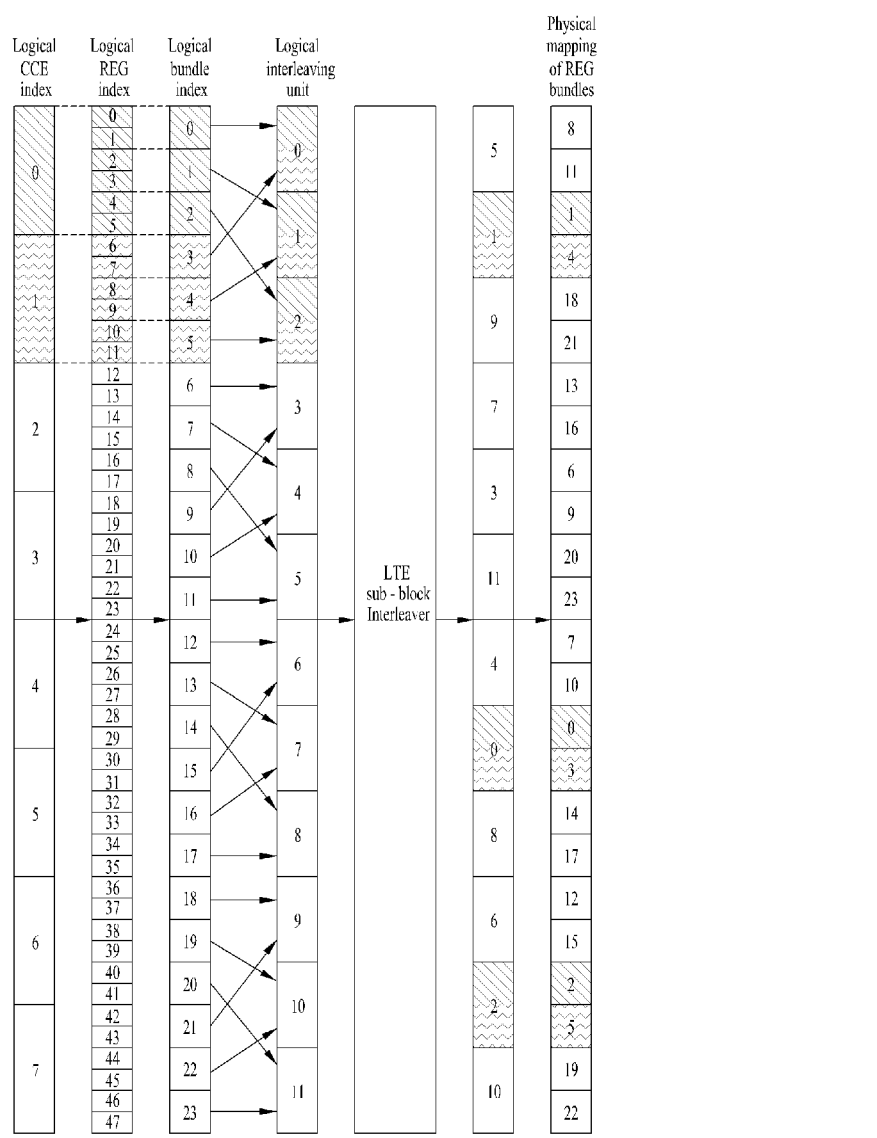
FIG. 6 illustrates an REG bundle set based interleaving structure according to an embodiment of the present disclosure.

FIG. 6 illustrates an REG bundle set based interleaving structure.

In FIG. 6, a CORESET consisting of 48 REGs is assumed. An REG bundle set size (i.e., the number of REG bundles constituting the REG bundle set) may be signaled by the network (e.g., CORESET configuration) or may be implicitly determined by another parameter (e.g., AL) in the CORESET configuration.

In FIG. 6, a logical interleaving unit may mean an REG bundle set in the logical domain. Each REG bundle of CCEs desired to be contiguously arranged after interleaving is included in the REG bundle set one by one. Specifically, in FIG. 6, a total of 12 REG bundle sets #0 to #11 is present, two REG bundles #0 and #3 are included in REG bundle set #0, two REG bundles #1 and #4 are included in REG bundle set #1, and two REG bundles #2 and #5 are included in REG bundle set #2. Since interleaving is performed in units of REG bundle sets, two REGs belonging to the same REG bundle set are contiguous in the frequency domain even after interleaving.

Currently, the network may configure 1-symbol, 2-symbol, and 3-symbol CORESETs for NR PDCCH transmission and reception and REG bundling may be performed to improve channel estimation performance of the UE. In the case of the 1-symbol CORESET, REG bundling may be performed in units of 2 REGs or 6 REGs in the frequency domain. In the case of the 2-symbol CORESET and the 3-symbol CORESET, REG bundling may be performed in a CORESET duration (e.g., 2 for the 2-symbol CORESET and 3 the for the 3-symbol CORESET) or in units of 6 REGs, based on time-first mapping. Since time-first mapping is assumed, interleaving may be determined based on the REG bundle size in the frequency domain. Even if frequency-first mapping is introduced, interleaving may be performed based on the REG bundle size in the frequency domain when interleaving of a symbol unit is applied.

For example, REG bundles included in each REG bundle set may be determined as in Equation 2.

$$\text{REG\_bundle\_set}_X = \{\text{REG\_bundle}Y\}(X=0,1,2,\ldots,(\lfloor C/A \rfloor-1), Y=0,1,\ldots,A-1)$$

$$\text{REG\_bundle}_Y = (A \cdot B) \cdot \lfloor X/B \rfloor + (B \cdot Y) + (X \% B) \quad \text{[Equation 2]}$$

In Equation 2, REG_bundle$_Y$ denotes a logical bundle index of a Y-th element (i.e., REG bundle) in an REG bundle set X. A denotes an REG bundle set size which may be equal to the number of REG bundles per REG bundle set in the frequency domain. B denotes the number of REG bundles per CCE in the frequency domain. C denotes the number of REG bundles per CORESET in the frequency domain. $\lfloor L \rfloor$ denotes the greatest integer that does not exceed L. M % L denotes the remainder obtained by dividing M by N.

When a (logical) REG bundle set configuration scheme as indicated in Equation 2 is applied to the embodiment of FIG. 6, a result as indicated in Equation 3 may be obtained. In FIG. 6, A=2, that is, each REG bundle set consists of two different REG bundles. B=3, that is, 3 REG bundles constitute one REG bundle set in the frequency domain. This may mean that the REG bundle size is 2 in the 2-symbol CORESET.

$A=2$ $B=3$ $X=0,1,2,\ldots,11$ (max $X=\lfloor 24/2 \rfloor-1=11$), $Y=0,1$ $$\text{REG\_bundle\_set0} = \{(2 \cdot 3) \cdot \lfloor 0/3 \rfloor + (3 \cdot 0) + (0\%3),$$
$$(2 \cdot 3) \cdot \lfloor 0/3 \rfloor + (3 \cdot 1) + (0\%3)\} = \{0,3\}$$

$$\text{REG\_bundle\_set1} = \{(2 \cdot 3) \cdot \lfloor 1/3 \rfloor + (3 \cdot 0) + (1\%3),$$
$$(2 \cdot 3) \cdot \lfloor 1/3 \rfloor + (3 \cdot 1) + (1\%3)\} = \{1,4\}$$

$$\text{REG\_bundle\_set2} = \{(2 \cdot 3) \cdot \lfloor 2/3 \rfloor + (3 \cdot 0) + (2\%3),$$
$$(2 \cdot 3) \cdot \lfloor 2/3 \rfloor + (3 \cdot 1) + (2\%3)\} = \{2,5\}$$

$$\text{REG\_bundle\_set3} = \{(2 \cdot 3) \cdot \lfloor 3/3 \rfloor + (3 \cdot 0) + (3\%3),$$
$$(2 \cdot 3) \cdot \lfloor 3/3 \rfloor + (3 \cdot 1) + (3\%3)\} = \{6,9\}$$

$$\text{REG\_bundle\_set11} = \{(2 \cdot 3) \cdot \lfloor 11/3 \rfloor + (3 \cdot 0) + (11\%3),$$
$$(2 \cdot 3) \cdot \lfloor 11/3 \rfloor + (3 \cdot 1) + (11\%3)\} = \{20,23\} \quad \text{[Equation 3]}$$

As such, if REG bundle indexes included in each (logical) REG bundle set are determined, an interleaving function is applied to all REG bundle sets. After interleaving, if each REG bundle set is converted into REG bundles, an REG bundle arrangement in which physical mapping is performed may be derived.

As another method of performing interleaving in an NR control channel by the network/UE, an interleaving unit size may be configured separately from the REG bundle size. For example, the network may configure the interleaving unit size to be applied to a specific CORESET for the UE in units of an REG. As an example, the network may configure interleaving to be performed in units of 6 REGs (regardless of the REG bundle size). The REG bundle size may be configured in addition to the interleaving unit size. The interleaving unit size may be greater than or equal to the REG bundle size.

When the interleaving unit is defined as described above, a distributed degree of the REG bundle or the REG bundle set may be determined by the network, so that the network may effectively cope with blocking.

For example, a blocking probability may be increased when the network needs to simultaneously transmit a plurality of PDCCHs (e.g., PDCCHs carrying control information). In this case, the network may configure the interleaving unit size to be large to lower the block probability instead of reducing frequency diversity gain. If load on control information transmission is low, the network may reduce the interleaving unit size in order to maximize frequency diversity gain.

The interleaving unit size may be included in the CORESET configuration, may be indicated by higher layer signaling separately from the CORESET configuration, or may be transmitted through a MAC control element (CE) or downlink control information (DCI) for dynamic signaling. When the MAC CE or the DCI is used to indicate the interleaving unit size, an offset for determining when the indicated interleaving unit size is applied may be predefined or signaled together.

<Configurability of Interleaving Parameters and AL Set>

The interleaving scheme proposed above serves to perform interleaving by grouping REG bundles belonging to different CCEs and to minimize an increase in blocking probability as an AL is increased.

Although various examples for this purpose have been proposed above, the above proposed schemes will be referred to as REG bundle set based interleaving hereinbelow for convenience of description. Hereinbelow, the REG bundle set size will be defined as the number of different REG bundles included in the REG bundle set, which may be replaced with the number of CCE groups, the number of REG bundle groups, and the like according to an embodiment.

Resource Boundary Alignment

REG bundle set based interleaving reduces blocking based on boundary alignment in units of an REG bundle and/or an REG bundle set between different CORESETs. REG bundle set based interleaving may provide optimal performance when different CORESETs fully overlap or when different CORESETs at least partially overlap in the time domain (and fully overlap in the frequency domain).

If the CORESETs partially overlap in the frequency domain, the network may configure the CORESETs such that a starting position of each CORESET (in the frequency domain) is aligned at an REG level or an REG bundle set level. If the starting position of each CORESET in the frequency domain is not aligned, the network may reconfigure a starting position of a specific CORESET in the frequency domain or configure an offset in a CORESET in which REG indexing starts.

In addition, when the size of a CORESET in the frequency domain is not a multiple of the REG bundle or REG bundle set, a region in which REG bundle indexing or REG bundle set indexing may be skipped may be signaled to the UE. This may be signaled in the form of an offset or in a manner of indicating a specific region.

Hashing Function

In LTE, candidates of a control channel that the UE should blind-detect are determined by a hashing function. In the case of a CSS, hashing is performed based on a common parameter and, in the case of USS, hashing is performed based on a UE ID. In addition, the hashing function outputs CCE indexes constituting a corresponding candidate. In this case, a starting CCE index of each candidate is determined as a multiple of a corresponding AL.

In NR, as a nested structure is introduced for the control channel, a hashing function different from that used in LTE may be used. The nested structure refers to a scheme in which candidates of different ALs share the same resource in order to reduce channel estimation complexity of the UE.

In this embodiment, in order for REG bundle set based interleaving to operate for the purpose of blocking avoidance, a starting CCE index of a candidate of each AL is set to a multiple of the corresponding AL. This may also be applied to a configuration of a low-AL candidate considering the nested structure. In other words, for the nested structure, it is desirable to select a resource of the low-AL candidate from among resources of a high-AL candidate. In this case, a CCE index of the selected resource of the low-AL candidate may be a multiple of the low AL.

In addition, the above-proposed REG bundle set based interleaving may effectively reduce blocking but may have a disadvantage of lowering a frequency diversity effect in a high AL. For example, when using REG bundle based interleaving, if the number of REG bundles constituting an AL-2 candidate is 6, the 6 REG bundles may be evenly distributed in the entire frequency domain so that the frequency diversity effect may be obtained. On the other hand, when REG bundle set based interleaving is used, since 3 REG bundle sets are distributed in the frequency domain when the REG bundle set size is 2 REGs, a relatively low frequency diversity effect appears.

In an embodiment of the present disclosure, the network may configure a CCE offset to be applied to a hashing result. In this case, interleaving is performed based on the REG bundle set and a starting CCE index, which is a multiple of an AL, is derived by the hashing function. However, an actual CCE index is set to a value obtained by adding the CCE offset to the derived starting CCE index. As a result, a candidate may include only a portion of the REG bundle set and may increase the frequency diversity effect.

If there are many UEs that need to receive scheduling information at the same time, the network may reduce the blocking probability using REG bundle set based interleaving proposed above and increase the frequency diversity effect through a hashing offset when load is low.

REG bundle set based interleaving may be applied only to a portion of candidates on which blind decoding should be performed at a corresponding AL. A candidate to which the offset is applied and the offset value may be configured by the network using higher layer signaling or may use predefined values (without signaling).

For example, if it is desired to reduce the blocking probability in CCE group based interleaving of FIG. 5, the network may use a hashing function through which a starting CCE index of an AL-2 candidate is determined as a multiple of 2. If load on control information is low, the network may configure the hashing function such that 1 is added to output of the hashing function. For example, assuming that the starting CCE index output as a result of hashing for AL 2 is 0, the network uses the starting CCE index 0 without change if it is desired to reduce the blocking probability so that corresponding candidates may be configured by CCEs #0 and #1. Alternatively, if load is low and it is desired to obtain the frequency diversity effect, the network adds a CCE offset 1 to the starting CCE index 0 so that corresponding candidates may be configured by CCEs #1 and #2. As in FIG. 5, it may be seen that the candidates configured by CCEs #1 and #2 are evenly distributed in the frequency domain.

REG Bundle Set Size

In NR, 1-symbol, 2-symbol, and 3-symbol CORESETs may be configured. One of two REG bundle sizes (e.g., 2 and 6 for the 1-symbol CORESET, 2 and 6 for the 2-symbol CORESET, and 3 and 6 for the 3-symbol CORESET) may be configured in each duration. In addition, CCE-to-REG mapping may be differently configured according to whether interleaving is configured. Hereinafter, for convenience, a CORESET with interleaving will be referred to as a distributed CORESET and a CORESET without interleaving will be referred to as a localized CORESET. As a result, a CORESET configuration provided to the UE corresponds to one of 9 types (except for a CORESET case having different resource regions).

When CORESETs of 9 types are present, there are about 36 possible CORESET overlap cases. For each case, characteristics such as a bundle size in the frequency domain and the number of REG bundles per CCE in the frequency domain may differ. Therefore, a different REG bundle set size may be required for each case. Accordingly, in an embodiment of the present disclosure, an REG bundle set size may be configured per CORESET.

Aggregation Level Set

An additional AL may be required according to the REG bundle sizes of overlapping CORESETs in the frequency domain. For example, if a 2-symbol distributed CORESET #1 with an REG bundle size of one REG in the frequency domain (i.e., two contiguous REGs in the time domain constitute one REG bundle) overlaps with a 2-symbol localized CORESET #2, the REG bundle sizes of the respective CORESETs in the frequency domain are 1 and 3. To align boundaries of the REG bundle set and the REG bundle between the CORESETs #1 and #2 using REG bundle level interleaving proposed above, the REG bundle set size should be 3. This may mean that the 2-symbol distributed CORESET #1 should support an AL 3 according to the characteristics of the overlapping CORESET #2. In this case, the AL of the 2-symbol distributed CORESET #1 may use all or part of {1, 3, 6, 12}.

Additionally, there is the case in which blocking may be reduced using only an AL such as {1, 3, 6, 12}. For example, if a 1-symbol distributed CORESET (e.g., bundle size is 6) and a 3-symbol localized CORESET overlap, blocking between the two CORESETs may be greatly reduced by setting an AL of the 3-symbol localized CORESET to {1, 3, 6, 12}. The same principle may be applied to the case in which a 1-symbol localized CORESET and a 3-symbol localized CORESET overlap.

Therefore, it is proposed to configure an AL set per CORESET. For example, two AL sets of {1, 2, 4, 8 (, 16, 32)} and {1, 3, 6, 12 (, 24, 48)} are predefined and the UE may be configured to assume a specific AL set or a subset of the specific AL set in a specific CORESET. This may be signaled using higher layer signaling or indicated to the UE through a CORESET configuration.

Association of REG Bundle Set Size and AL Set

The REG bundle set size and the AL set may be associated for a CORESET and configured as follows. In the following methods, an AL may be defined only in a set unit and a subset that should be actually assumed in the set may be configured by the CORESET configuration.

According to the first method, a plurality of combinations of REG bundle set sizes and AL sets (or subsets of AL sets) may be predefined through a table and the network may configure an index of a combination to be used in a specific CORESET. This method has an advantage of reducing signaling overhead when the number of combinations is not large.

According to the second method, if the network configures an AL, an REG bundle set size may be determined in conjunction with the AL. For example, for a CORESET configured with an AL {1, 3, 6, 12}, the UE may be predefined to assume that the REG bundle set size is 3. This is a method of aligning boundaries between REG bundles (REG bundle sets), based on the fact that the REG bundle set size is closely related to the AL.

According to the third method, the REG bundle set size, the AL, etc. are predefined per combination of CORESETs.

When a plurality of CORESETs is configured for the UE, the UE may implicitly determine the REG bundle set size and the AL of each CORESET according to the relationship between the configured CORESETs. For example, as illustrated in FIG. 5, it is assumed that the 1-symbol distributed CORESET (e.g., the REG bundle size in the frequency domain is 2 and the REG bundle size in the time domain is 1) and the 2-symbol distributed CORESET (e.g., the REG bundle size in the frequency domain is 1 and the REG bundle size in the time domain is 2) overlap in a 1-symbol CORESET region. In this case, the REG bundle set size of the 1-symbol CORESET may be determined as 1 and the AL set of the 1-symbol CORESET may be determined as {1, 2, 4, 8}. The REG bundle set size of the 2-symbol CORESET may be determined as 2 and the AL set of the 2-symbol CORESET may be determined as {1, 2, 4, 8}.

<Possible Overlap Cases>

The following description is given of detailed examples to solve blocking in each overlap case. The above-described methods may be applied to each of the listed cases or a representative solution may be applied by grouping a plurality of cases. For example, some of the following cases may be excluded due to low availability.

In the case of full overlap between CORESETs having different REG bundle sizes in the frequency domain or partial overlap in the time domain therebetween, REG bundle set based interleaving may be applied to a CORESET having a small REG bundle size. Therefore, a CORESET with a large REG bundle size and a CORESET with a small REG bundle size may be configured to have the same REG bundle set size. In this case, blocking may be reduced most significantly.

In Table 5 below, ① indicates the case in which blocking may be reduced most significantly, ② indicates that a ratio capable of reducing blocking is lower than ①, and ③ indicates the case in which an REG bundle set size of 1 and an existing AL of {1, 2, 4, 8} may be used. ④ indicates the case in which the present disclosure may not be applied or may be limitedly applied due to mismatch of REG bundle (set) sizes and to the REG bundle size.

Each combination of Table 5 indicates a method that may be used to reduce blocking. For example, Bset means that REG bundle set based interleaving is used and AL means that an AL {1, 3, 6, 12} is used.

In Table 5, a CORESET in which a CORESET duration is a, a CORESET type is a distributed CORESET, and an REG bundle size in the frequency domain is b is simply referred to as aD(b). A CORESET in which a CORESET duration of a, the CORESET type is a localized CORESET, and the REG bundle size in the frequency domain is b is simply referred to as aL(b).

TABLE 5

|       | 1D (2) | 2D (1)   | 3D (1) | 1D (6)          | 2D (3)          | 3D (2)        | 1L (6)          | 2L (3)          | 3L (2)        |
|-------|--------|----------|--------|-----------------|-----------------|---------------|-----------------|-----------------|---------------|
| 1D (2)| —      | Bset ① | ④    | Bset & AL ①   | ④             | No change ③ | Bset & AL ①   | Bset & AL ②   | No change ③ |
| 2D (1)| —      | —        | ④    | Bset & AL ②   | Bset & AL ①   | Bset ①      | Bset & AL ②   | Bset & AL ①   | Bset ①      |
| 3D (1)| —      | —        | —      | Bset& AL ②    | Bset & AL ①   | Bset ①      | Bset & AL ②   | Bset & AL ①   | Bset ①      |
| 1D (6)| —      | —        | —      | —               | ④             | ④           | No change ③   | No change ③   | AL ①        |
| 2D (3)| —      | —        | —      | —               | —               | ④           | ④             | No change ③   | ④           |

TABLE 5-continued

|  | 1D (2) | 2D (1) | 3D (1) | 1D (6) | 2D (3) | 3D (2) | 1L (6) | 2L (3) | 3L (2) |
|---|---|---|---|---|---|---|---|---|---|
| 3D (2) | — | — | — | — | — | — | ④ | ④ | No change ③ |
| 1L (6) | — | — | — | — | — | — | — | No change ③ | AL ① |
| 2L (3) | — | — | — | — | — | — | — | — | AL ② |
| 3L (2) | — | — | — | — | — | — | — | — | — |

1D(2) versus 2D(1): Category ①
Bundle set size of 1D(2)=1, bundle set size of 2D(1)=2
AL of 1D(2)={1, 2, 4, 8}, AL of 2D(1)={1, 2, 4, 8}
1D(2) versus 3D(1): Category ④
The number of REG bundles constituting one CCE in the frequency domain differs according to a CORESET. In the frequency domain, in 1D(2), 3 REG bundles constitute one CCE and, in 3D(1), 2 REG bundles constitute one CCE. Accordingly, even if interleaving unit sizes are adjusted in the frequency domain, blocking occurs by the remaining REG bundle.

When the REG bundle set size of 3D(1) is set to 2, blocking may be further reduced. However, this may be inefficient in terms of frequency diversity.

1D(2) versus 1D(6): Category ①
Bundle set size of 1D((2)=3, bundle set size of 1D(6)=1
AL of 1D(2)={1, 3, 6, 12}, AL of 1D(6)={1, 2, 4, 8}
1D(2) versus 2D(3): Category ④
When only a boundary between REG bundles is considered, if the bundle set size of 1D((2) is set to 3 and the bundle set size of 2D(3) is set to 2, blocking may be reduced.

However, 2D(3) shows a localized mapping type at an AL 1 even though 2D(3) is distributed mapping. If an REG bundle set is configured, 2D(3) may not have characteristics of distributed mapping. Accordingly, it may be desirable not to permit REG bundle set based interleaving for 1D(6), 2D(3), and 3D(2).

1D(2) versus 3D(2): Category ③
Bundle set size of 1D((2)=1, bundle set size of 3D(2)=1
AL of 1D(2)={1, 2, 4, 8}}, AL of 3D(2)={1, 2, 4, 8}
1D(2) versus 1L(6): Category ①
Bundle set size of 1D((2)=3
AL of 1D(2)={1, 3, 6, 12}, AL of 1L(6)={1, 2, 4, 8}
1D(2) versus 2L(3): Category ②
A boundary may be aligned in units of 6 REGs.
Bundle set size of 1D((2)=3
AL of 1D(2)={1, 3, 6, 12}, AL of 2L(3)={1, 2, 4, 8}
1D(2) versus 3L(2): Category ③
Bundle set size of 1D((2)=1 (or possibly 2)
AL of 1D(2)={1, 2, 4, 8}, AL of 3L(2)={1, 2, 4, 8}
2D(1) versus 3D(1): Category ④
For the same reason as in the case of 1D(2) versus 3D(1), it may be desirable not to permit REG bundle set based interleaving.

2D(1) versus 1D(6): Category ②
A boundary may be aligned in units of 6 REGs. AL 4 of 2D(1) (accordingly, blocking is increased at AL 2)
Bundle set size of 2D(1)=3, bundle set size of 1D(6)=1
AL of 2D(1)={1, 3, 6, 12}, AL of 1D(6)={1, 2, 4, 8}
2D(1) versus 2D(3): Category ①
Bundle set size of 2D(1)=3, bundle set size of 2D(3)=1
AL of 2D(1)={1, 3, 6, 12}, AL of 2D(3)={1, 2, 4, 8}
2D(1) versus 3D(2): Category ①
Bundle set size of 2D(1)=2, bundle set size of 3D(2)=1
AL of 2D(1)={1, 2, 4, 8}, AL of 3D(2)={1, 2, 4, 8}

2D(1) versus 1L(6): Category ②
A boundary may be aligned in units of 6 REGs. AL 4 of 2D(1) (accordingly, blocking is increased at AL 2)
Bundle set size of 2D(1)=3, bundle set size of 1D(6)=1
AL of 2D(1)={1, 3, 6, 12}, AL of 1D(6)={1, 2, 4, 8}
2D(1) versus 2L(3): Category ①
Bundle set size of 2D(1)=3
AL of 2D(1)={1, 3, 6, 12}, AL of 2L(3)={1, 2, 4, 8}
2D(1) versus 3L(2): Category ①
Bundle set size of 2D(1)=2, bundle set size of 3D(2)=1
AL of 2D(1)={1, 2, 4, 8}, AL of 3D(2)={1, 2, 4, 8}
3D(1) versus 1D(6): Category ②
Bundle set size of 3(D)1=3, bundle set size of 1D(6)=1
AL of 3D(1)={1, 3, 6, 12}, AL of 1D(6)={1, 2, 4, 8}
3D(1) versus 2D(3): Category ①
Bundle set size of 3(D)1=3, bundle set size of 2D(3)=1
AL of 3D(1)={1, 3, 6, 12}, AL of 2D(3)={1, 2, 4, 8}
3D(1) versus 3D(2): Category ①
Bundle set size of 3(D)1=2, bundle set size of 3D(2)=1
AL of 3D(1)={1, 2, 4, 8}, AL of 3D(2)={1, 2, 4, 8}
3D(1) versus 1L(6): Category ②
Bundle set size of 3(D)1=3
AL of 3D(1)={1, 3, 6, 12}, AL of 1L(6)={1, 2, 4, 8}
3D(1) versus 2L(3): Category ①
Bundle set size of 3(D)1=3
AL of 3D(1)={1, 3, 6, 12}, AL of 2L(3)={1, 2, 4, 8}
3D(1) versus 3L(2): Category ①
Bundle set size of 3(D)1=2
AL of 3D(1)={1, 2, 4, 8}, AL of 2L(3)={1, 2, 4, 8}
1D(6) versus 2D(3): Category ④
REG bundle set based interleaving is inapplicable to 2D(3).
1D(6) versus 3D(2): Category ④
REG bundle set based interleaving is inapplicable to 2D(3).
1D(6) versus 1L(6): Category ③
Bundle set size of 1D(6)=1
AL of 1D(6)={1, 2, 4, 8}, AL of 1L(6)={1, 2, 4, 8}
1D(6) versus 2L(3): Category ③
Bundle set size of 1D(6)=1
AL of 1D(6)={1, 2, 4, 8}, AL of 2L(3)={1, 2, 4, 8}
1D(6) versus 3L(2): Category ①
Bundle set size of 1D(6)=1
AL of 1D(6)={1, 2, 4, 8}, AL of 3L(2)={1, 3, 6, 12}
2D(3) versus 3D(2): Category ④
REG bundle set based interleaving is inapplicable to 3D(2).
2D(3) versus 1L(6): Category ④
REG bundle set based interleaving is inapplicable to 2D(3).
2D(3) versus 2L(3): Category ③
Bundle set size of 2D(3)=1
AL of 2D(3)={1,2,4,8}, AL of 2L(3)={1, 2, 4, 8}
2D(3) versus 3L(2): Category ④

REG bundle set based interleaving is inapplicable to 2D(3).

3D(2) versus 1L(6): Category ④
REG bundle set based interleaving is inapplicable to 3D(2).

3D(2) versus 2L(3): Category ④
REG bundle set based interleaving is inapplicable to 3D(2).

3D(2) versus 3L(2): Category ③
Bundle set size of 3D(2)=1
AL of 3D(2)={1, 2, 4, 8}, AL of 3L(2)={1, 2, 4, 8}
1L(6) versus 2L(3): Category ③
AL of 1L(6)={1, 2, 4, 8}, AL of 2L(3)={1, 2, 4, 8}
1L(6) versus 3L(2): Category ①
AL of 1L(6)={1, 2, 4, 8}, AL of 2L(3)={1, 3, 6, 12}
2L(3) versus 3L(2): Category ②
AL of 2L(3)={1, 2, 4, 8}, AL of 3L(2)={1, 3, 6, 12}

The above-proposed methods (e.g., FIG. 3 and FIG. 6) configure one REG bundle set by extracting REG bundles from contiguous CCEs. The number of contiguous CCEs to be used to configure one REG bundle set may be configured by an REG bundle set size. In addition, REG bundles belonging to the REG bundle set may be contiguously arranged even in the physical domain after interleaving. According to this method, when the REG bundle set size is 2, the number of CCEs blocked (in another CORESET) is reduced by REG bundles constituting an AL-2 candidate.

Although this method may reduce blocking by the AL-2 candidate, the method has a disadvantage of reducing frequency diversity gain. When REG bundle set based interleaving (e.g., REG bundle set size=2) is used, an AL-1 candidate and the AL-2 candidate have similar diversity gain in terms of frequency diversity. This is a result of reducing frequency diversity gain of the AL-2 candidate in order to reduce blocking although the AL-2 candidate should obtain higher frequency diversity gain than the AL-1 candidate.

Figure 7:
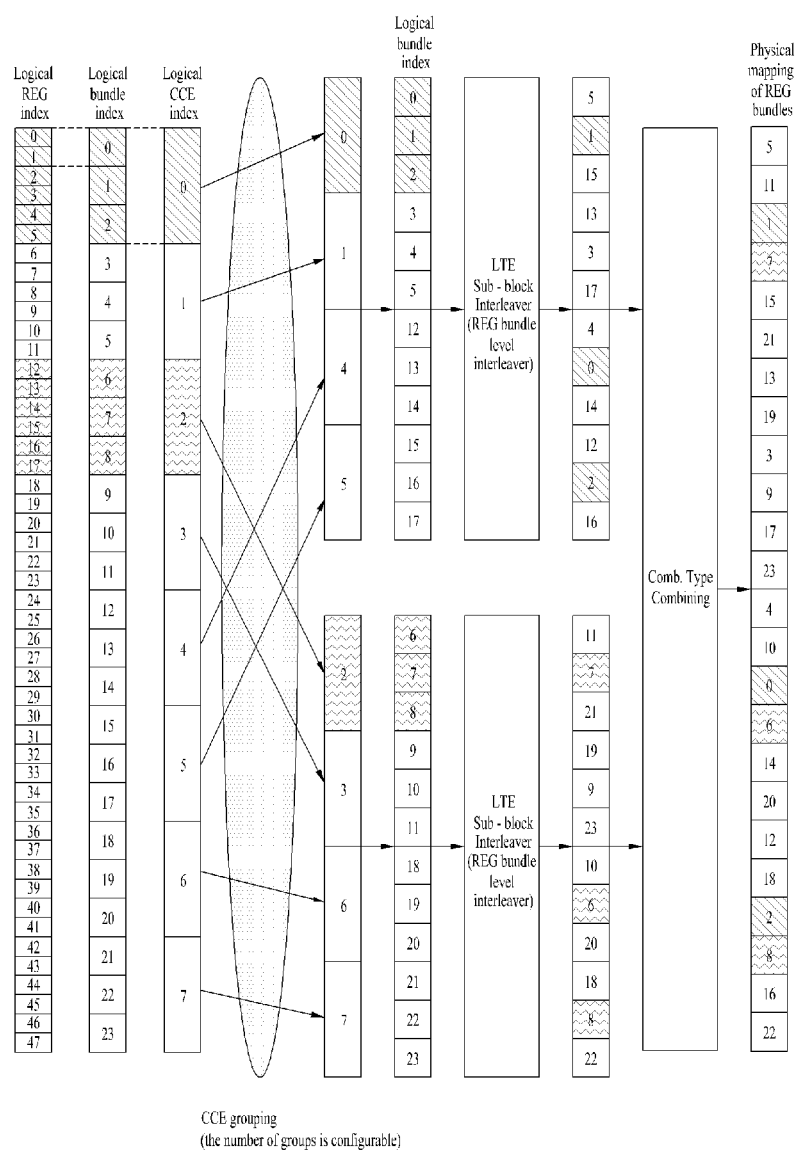
FIGS. 7 and 8 illustrate interleaving structures according to embodiments of the present disclosure.
Figure 8:
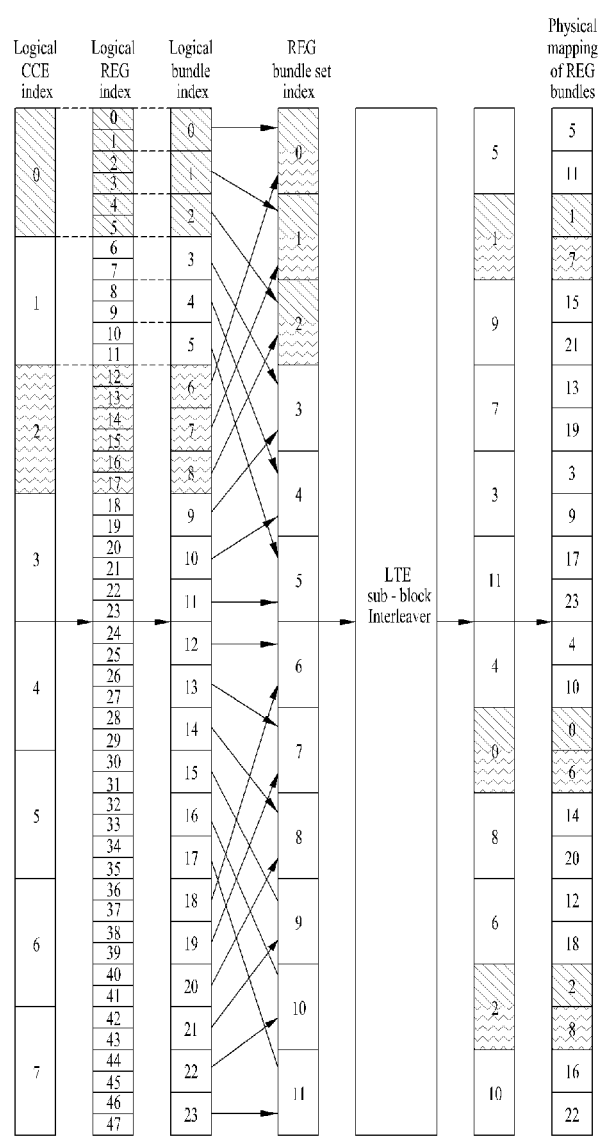

To solve this problem, a CCE configuration associated with the same REG bundle set (in addition to the above methods) may be changed. For example, assuming that contiguous CCEs in the logical domain constitute one high-AL candidate, all REGs included in one REG bundle set may be extracted from even-numbered CCEs or all of the REGs may be extracted from odd-numbered CCEs. This method may be understood as extracting REG bundles for one REG bundle set from CCEs that belong to the same candidate (at a high AL) but are non-contiguous. FIGS. 7 and 8 illustrate results of applying the present proposal to FIGS. 3 and 6, respectively.

According to this method, a blocking probability at AL 2 is slightly increased but performance improvement may be expected due to frequency diversity gain at AL 2. In FIGS. 7 and 8, the blocking probability at AL 4 may be equally maintained as in FIGS. 3 and 6, respectively. Therefore, the present embodiment may obtain frequency diversity gain for ALs 1 and 2 and reduce the blocking probability for ALs 4 and 8.

Figure 9:
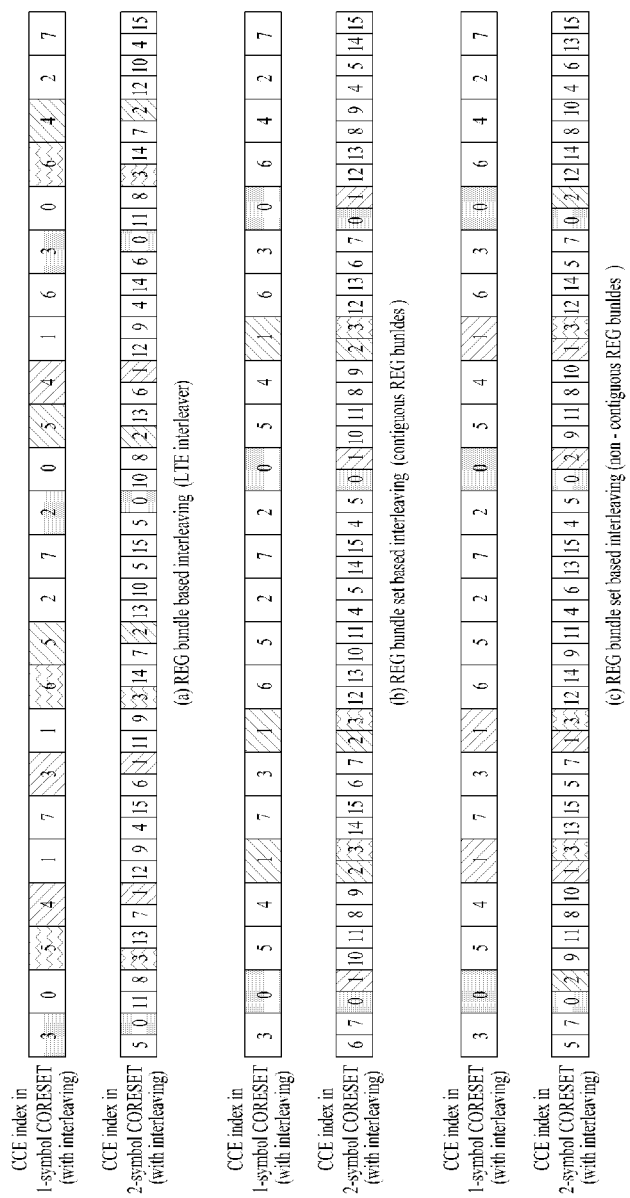
FIG. 9 illustrates blocking between CORESETs according to an embodiment of the present disclosure.

FIG. 9 illustrates the amount of resources blocked when the present embodiment is applied to FIG. 5.

In FIG. 9, (a) illustrates the case in which REG bundle level interleaving is applied, (b) illustrates the case in which REG bundle set level interleaving is performed but a REG bundle set is configured by contiguous CCEs (e.g., CCEs 0 and 1, CCEs 2 and 3, CCEs 4 and 5, etc.), and (c) illustrates the case in which an REG bundle set is configured by non-contiguous CCEs (e.g., CCEs 0 and 2, CCEs 1 and 3, CCEs 4 and 6, CCEs 5 and 7, etc.).

In the method of (c) of FIG. 9, an AL-2 candidate of a 2-symbol CORESET blocks a large number of CCEs of a 1-symbol CORESET relative to the method (b). For example, in (b), AL-1, AL-2, AL-4, and AL-8 candidates of the 2-symbol CORESET block 3, 3, 6, and 6 CCEs of the 1-symbol CORESET, respectively. In (c), AL-1, AL-2, AL-4, and AL-8 candidates of the 2-symbol CORESET block 3, 6, 6, 6 CCEs of the 1-symbol CORESET. In (c), only the number of CCEs blocked by the AL-2 candidate is slightly increased as compared with (b). Meanwhile, the AL-2 candidate of (c) has an advantage that frequency diversity gain caused by distribution in the frequency domain may be greatly obtained as compared with (b).

Figure 10:
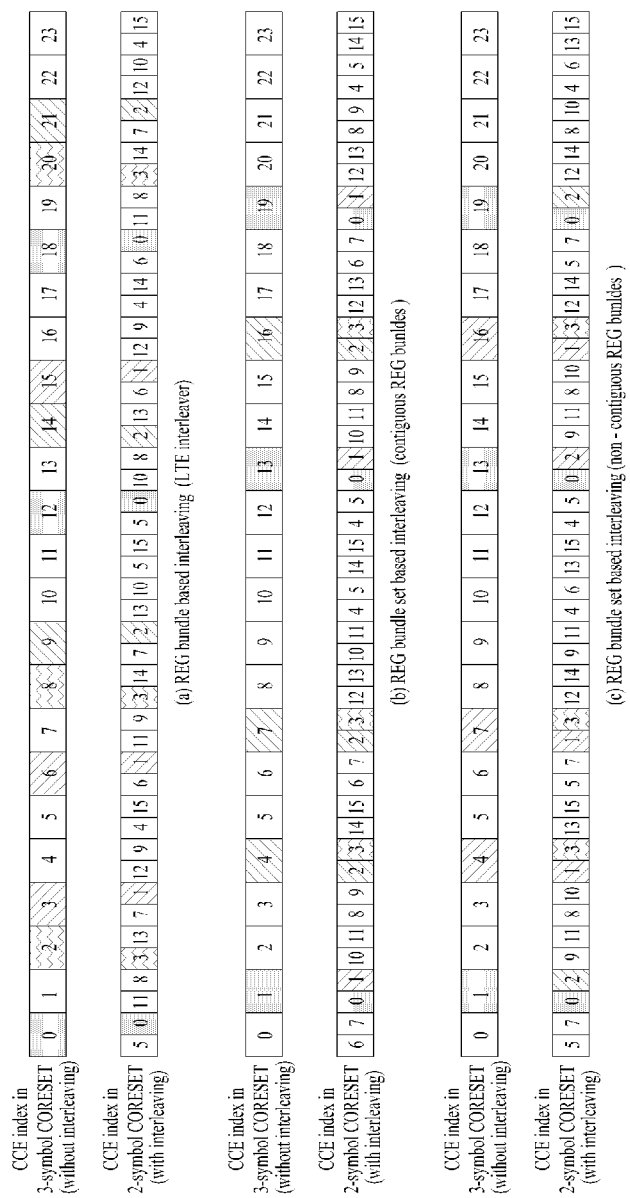
FIG. 10 illustrates overlap between a CORESET without interleaving and a CORESET with interleaving according to an embodiment of the present disclosure.

FIG. 10 illustrates the case in which a 3-symbol CORESET without interleaving and a 2-symbol CORESET with interleaving (e.g., REG bundle size=2) overlap. It may be seen that the same result as in FIG. 9 occurs in FIG. 10.

When configuring an REG bundle set for REG bundle set based interleaving, CCEs from which REG bundles constituting the REG bundle set are extracted may be contiguous or non-contiguous. One of a scheme in which CCEs are contiguous and a scheme in which CCEs are non-contiguous may be configured (e.g., CORESET configuration) to be used by predefinition or by higher layer signaling. If configurability related to contiguous/non-contiguous CCEs is supported, the network may configure a target suitable for a network situation among blocking avoidance and frequency diversity gain and determine an interleaving scheme for the target.

<Resource Grouping>

Hereinabove, interleaving applied to the entire CORESET has been described. When interleaving is performed on all resources of the CORESET, distribution caused by interleaving is evenly performed, whereas resource usage may be limited in terms of the CORESET impacted by blocking.

For example, if REG bundle set based interleaving in a 2-symbol CORESET is performed in (b) or (c) of FIG. 10, the number of blocked CCEs of a 3-symbol CORESET may be greatly reduced due to a candidate of the 2-symbol CORESET. However, since distributed mapping is used in the 2-symbol CORESET, blocking evenly occurs in the 3-symbol CORESET using localized mapping. As a result, a high AL candidate may not be used in the 3-symbol CORESET. For example, although an AL {1, 2, 4, 8} is configured in the 3-symbol CORESET, an AL-8 candidate among AL {1, 2, 4, 8} candidates may not be used in the 3-symbol CORESET in some cases.

Figure 11:
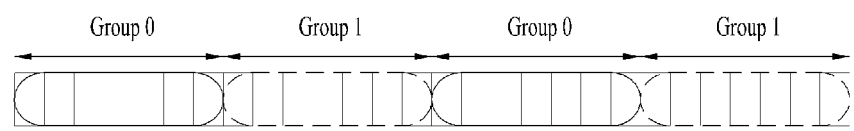
FIG. 11 illustrating resource grouping of a CORESET according to an embodiment of the present disclosure.

In order to solve this problem, it is proposed to classify all resources of a CORESET for which interleaving is configured into a plurality of sub-CORESETs and perform interleaving in units of each sub-CORESET. For example, as illustrated in FIG. 11, the entire CORESET may be divided into two groups and interleaving may be performed in each group.

As a more specific implementation example of resource grouping based interleaving, CCEs in the logical domain may be grouped into a plurality of groups and the network may perform interleaving for physical mapping in each group. For example, if the number of CCEs in the CORESET is 96, the network may configure two logical CCE groups each consisting of 48 CCEs (e.g., CCEs #0 to #47 are CCE group 0 and CCEs #48 to 95 are CCE group 1). Thereafter, interleaving is independently performed for each CCE group and mapping to the physical domain is performed. In this case, grouping of resources may be performed in the physical domain. The number of CCE groups in the logical domain and the number of resource groups in the physical domain may be configured to be equal and an interleaving result of a specific CCE group is applied to a specific resource group.

Figure 12:
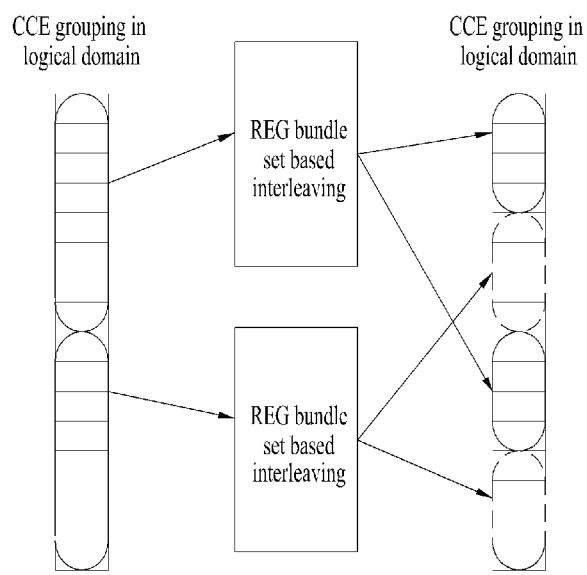
FIG. 12 illustrates resource grouping based interleaving according to an embodiment of the present disclosure.

FIG. 12 illustrates resource grouping based interleaving according to an embodiment of the present disclosure. In FIG. 12, CCE grouping in the logical domain and resource grouping in the physical domain may be applied to efficiently use resources (e.g., AL or candidate) in terms of the network and REG bundle set based interleaving may be used to minimize blocking in each group.

In FIG. 12, the number of groups and the size of each group for CCE grouping in the logical domain and resource grouping in the physical domain (e.g., the number of CCEs per group in the logical domain, and the number and location of RBs per group in the physical domain) may be signaled to each UE by higher layer signaling.

In addition, a CCE configuration scheme of each CCE group in the logical domain (e.g., forming a CCE group through contiguous CCEs, forming a group by CCEs satisfying a specific rule, and information about a specific rule) may be predefined (e.g., one CCE group is formed by CCEs having contiguous indexes) or indicated to the UE by the network through higher layer signaling.

In the interleaving schemes according to embodiments of the present disclosure, a relationship between an interleaver unit size applied to a final stage of interleaving and overlapping CORESETs may be as follows.

When interleaving (i.e., distributed mapping) is applied to all overlapping CORESETs, interleaver unit sizes (i.e., interleaver unit sizes in the frequency domain expressed as RBs or REGs) of the respective CORESETs may be the same.

When localized mapping is applied to one of the overlapping CORESETs and distributed mapping is applied to the other CORESET, an interleaver unit size in the CORESET to which distributed mapping is applied may be the same as an REG bundle size of the frequency domain of the CORESET to which localized mapping is applied. Alternatively, an REG bundle size of the frequency domain of a high-AL candidate of the CORESET to which localized mapping is applied and the interleaver unit size of the CORESET to which distributed mapping is applied may be the same.

As another example of performing interleaving on an NR-PDCCH, a block interleaver may be used. As a simple method to implement the block interleaver at an REG bundle level, the network/UE may write REG bundle indexes row by row in a block interleaver matrix (e.g., REG bundle indexes are written within a row in ascending order while increasing rows in ascending order) and read the REG bundle indexes by column by column.

Figure 13:
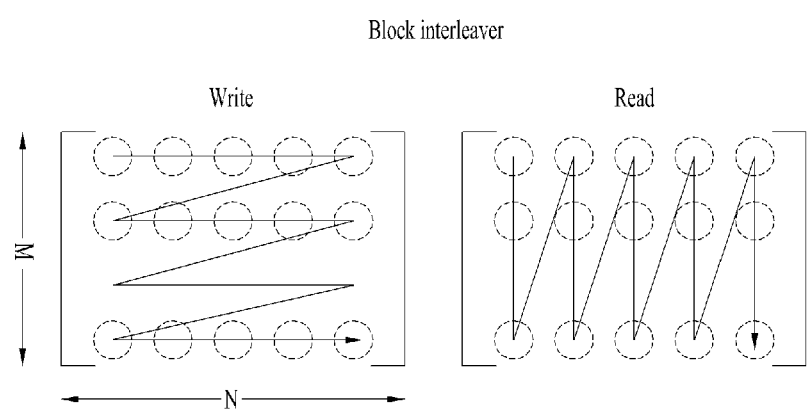
FIG. 13 illustrates an example of a write/read method of a block interleaver.

FIG. 13 illustrates an example of a write/read method of a block interleaver. However, according to an embodiment, a block interleaver as opposed to FIG. 13 may be implemented. For example, REG bundle indexes may be written column by column and read row by row. In this case, the contents of the following disclosure should be interpreted by replacing a row and a column with each other.

The block interleaver may be used to maximize frequency diversity (or channel estimation performance) by uniformly distributing resource units constituting one CCE or one candidate in the frequency domain. For the block interleaver, the UE receives the number of rows (hereinafter, 'M') and/or the number of columns (hereinafter, 'N') constituting an interleaver matrix from the network or M and/or N may be fixed to a predefined value.

In an REG bundle level interleaver, each component (or element) of an interleaver matrix may mean an REG bundle.

As an example, when M and/or N is fixed to a predefined value, the N value may be the number of REG bundles per CCE or a multiple of the number of REG bundles per CCE. When the block interleaver is configured as described above, interleaving may be performed with respect to a 3-symbol CORESET having an REG bundle size of 3 as follows.

Figure 14:
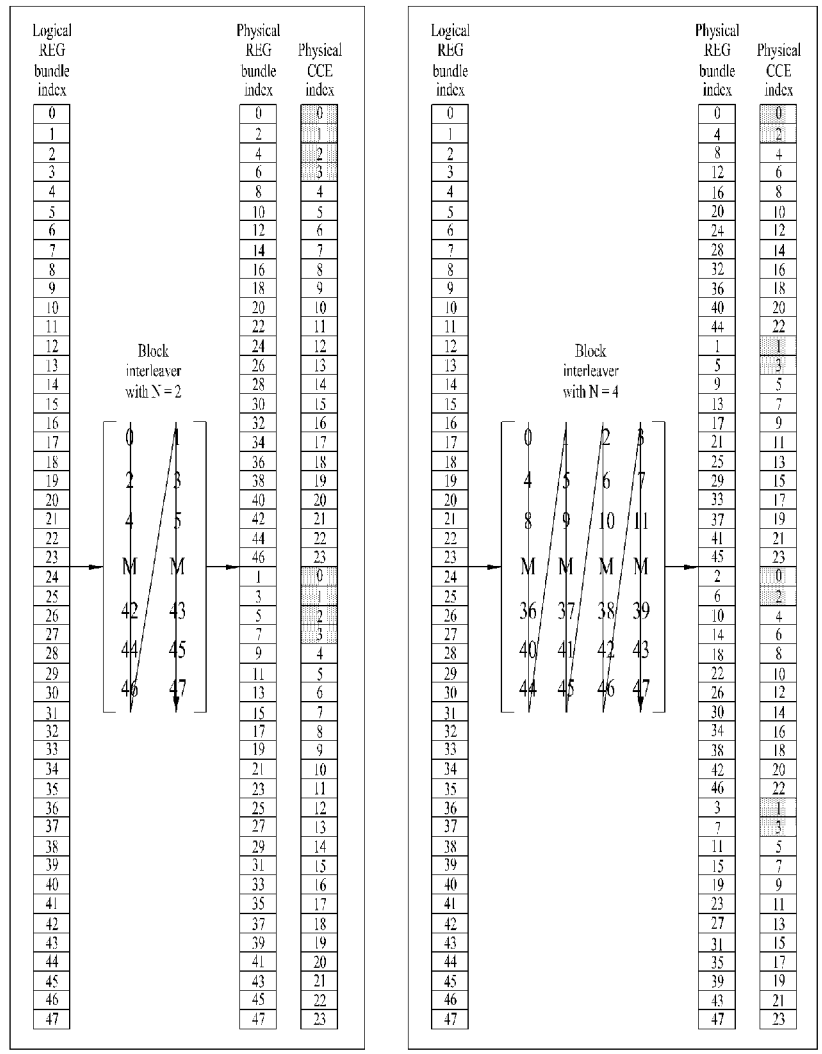
FIG. 14 illustrates interleaving using a block interleaver according to an embodiment of the present disclosure.

As illustrated in FIG. 14, when the block interleaver is used, positions of REG bundles constituting one candidate at a high AL may appear differently according to the M and N values of the block interleaver.

Referring to (a) of FIG. 14, frequency diversity may be maximized for an AL-1 candidate. However, since REG bundles constituting a candidate are contiguously arranged at an AL 2 or higher, frequency diversity gain may be reduced.

Referring to (b) of FIG. 14, the N value of the interleaver matrix is configured as twice (e.g., 4) the number of REG bundles per CCE and frequency diversity gain may be obtained at ALs 1 and 2. However, it is difficult to increase frequency diversity gain at ALs 4 and 8 in comparison with ALs 1 and 2.

An increase or decrease in frequency diversity gain may be associated with channel estimate gain. For example, in the case of (a) of FIG. 14, frequency diversity gain for a high AL candidate is lowered, whereas channel estimation performance may be increased when the UE assumes the same precoding since the REG bundles are contiguously arranged.

Therefore, in this embodiment, it is proposed that the network configure the N value (i.e., number of columns) of the block interleaver. Then, the network may flexibly adjust system performance in consideration of a tradeoff between frequency diversity gain and channel estimation performance.

The M value of the block interleaver may be configured by the network or implicitly determined by the N value. For example, the M value (e.g., the number of rows in the matrix) may be determined by dividing the number of REG bundles included in a CORESET by N. If the M*N value is greater than the total number of REG bundles in the CORESET, a null operation corresponding to the difference between the two values (i.e., M*N—the total number of REG bundles) may be defined and the null operation may be performed at the last part of a process of sequentially filling the matrix.

In NR, an REG bundle size of 6 in a CORESET may be configured. All REGs constituting one CCE configures one REG bundle and CCEs may be distributed in the frequency domain when an AL increases.

In this case, the N value of the block interleaver may mean a distributed degree of the CCEs and it is desirable that the N value be configured as a value larger than 1 for frequency diversity. If the value of N is less than an AL, two or more REG bundles may be contiguously arranged. If N is equal to the AL, REG bundles may be uniformly distributed in the frequency domain.

This method may be interpreted such that N is configured as a multiple (including x1) of the number of REG bundles per CCE when the REG bundle size is less than 6 and as a value greater than 1 when the REG bundle size is 6.

Additionally, the network may signal precoder granularity in order to secure transmit diversity gain.

For example, in (a) of FIG. 14, when interleaving is performed by the block interleaver, an AL-8 candidate appears in a form in which two groups each consisting of 8 REG bundles are distributed in the frequency domain. If the same precoding is assumed in each group, since transmit diversity gain may be reduced, an operation of further dividing the precoder granularity in each group may be necessary.

To this end, the precoder granularity is configured per CORESET. The precoder granularity may be determined as a multiple of the REG bundle size in the frequency domain. In this case, the precoder granularity may be configured as a maximum value. As a result of interleaving, if the REG bundles constituting one candidate are contiguously arranged in the frequency domain, the UE may assume the same precoding and the same precoding assumption may be applied only within the range of maximum precoder granularity.

For example, if the configured maximum precoder granularity is 6 REGs (in the frequency domain) and 10 REGs are contiguously arranged in the frequency domain as a result of interleaving, the UE may assume the same precoding for the first 6 REGs among the 10 REGs and separately assume the same precoding for the remaining 4 REGs. For example, the UE may assume the same precoding for each of a bundle of 6 REGs and a bundle of 4 REGs and perform channel estimation.

It is also possible to apply the block interleaver to REG bundle set based interleaving proposed above. For example, after configuring the REG bundle set as illustrated in FIG. 6, the network may define the REG bundle set as an interleaving unit. The network may also replace a sub-block interleaver with a block interleaver in a manner using the sub-block interleaver.

Figure 15:
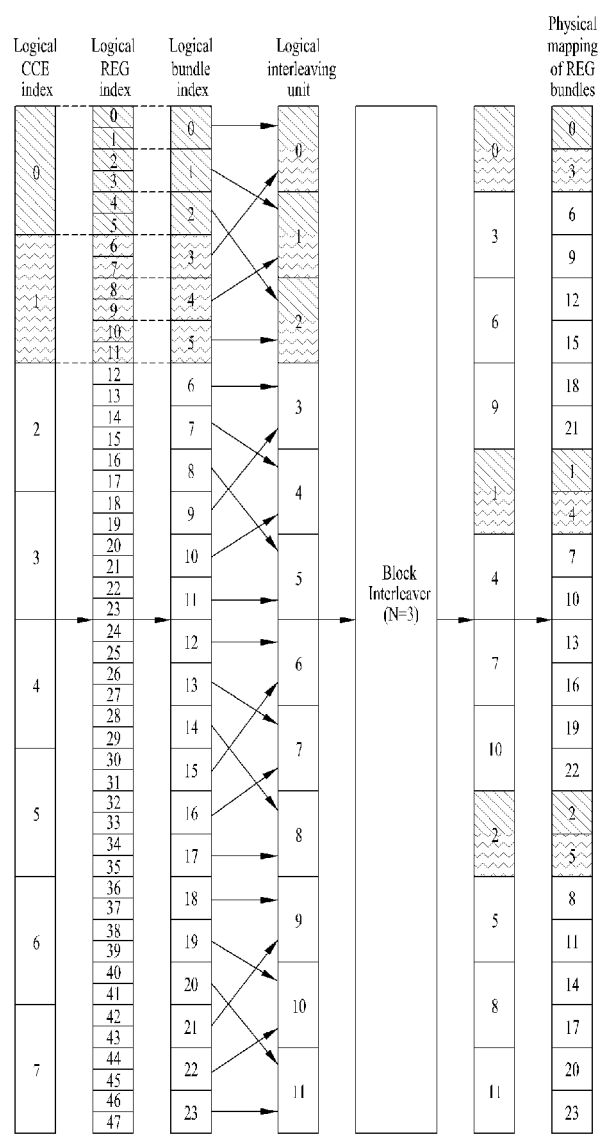
FIG. 15 illustrates REG bundle set based interleaving using a block interleaver according to an embodiment of the present disclosure.

FIG. 15 illustrates the case in which the block interleaver is applied to FIG. 6 according to an embodiment of the present disclosure. When the block interleaver is used for REG bundle set based interleaving, the distance between REG bundle sets is uniformly maintained in final physical mapping, so that gain may occur in terms of frequency diversity. Even in this case, the precoder granularity may be configured for each CORESET. For this purpose, the network may configure an interleaver unit (=REG bundle set size), which is an input of the block interleaver, through a CORESET configuration. A rule (e.g., Equation 2) for determining the interleaver unit in the logical domain may be defined according to the configured interleaver unit size.

In FIG. 15, the block interleaver may be used to configure an REG bundle set. This may be interpreted as contiguously arranging two block interleavers. For example, the first block interleaver may configure REG bundle sets by performing interleaving an REG bundle level and the second block interleaver may perform interleaving at an REG bundle set level. If REG bundles constituting a high-AL candidate are contiguously arranged at the output of the first block interleaver, this may be interpreted as using the second block interleaver to randomize the REG bundles.

N (and/or M) of the first block interleaver, N (and/or M) of the second block interleaver, and the interleaver unit size (=REG bundle set size) may be configured (e.g., CORESET configuration) for each CORESET by the network.

For example, a process of replacing logical REG bundle indexes with logical REG bundle set indexes in FIG. 15 may be implemented by the block interleaver. In this case, the N value (e.g., number of columns) of the first block interleaver may be set to 3 and interleaving may be performed at the REG bundle level. The REG bundle set size (i.e., interleaving unit) of the second block interleaver may be set to two contiguous REG bundles at the output of the first block interleaver. When the N value of the second block interleaver is set to 3, interleaving may be performed as illustrated in FIG. 16.

Figure 16:
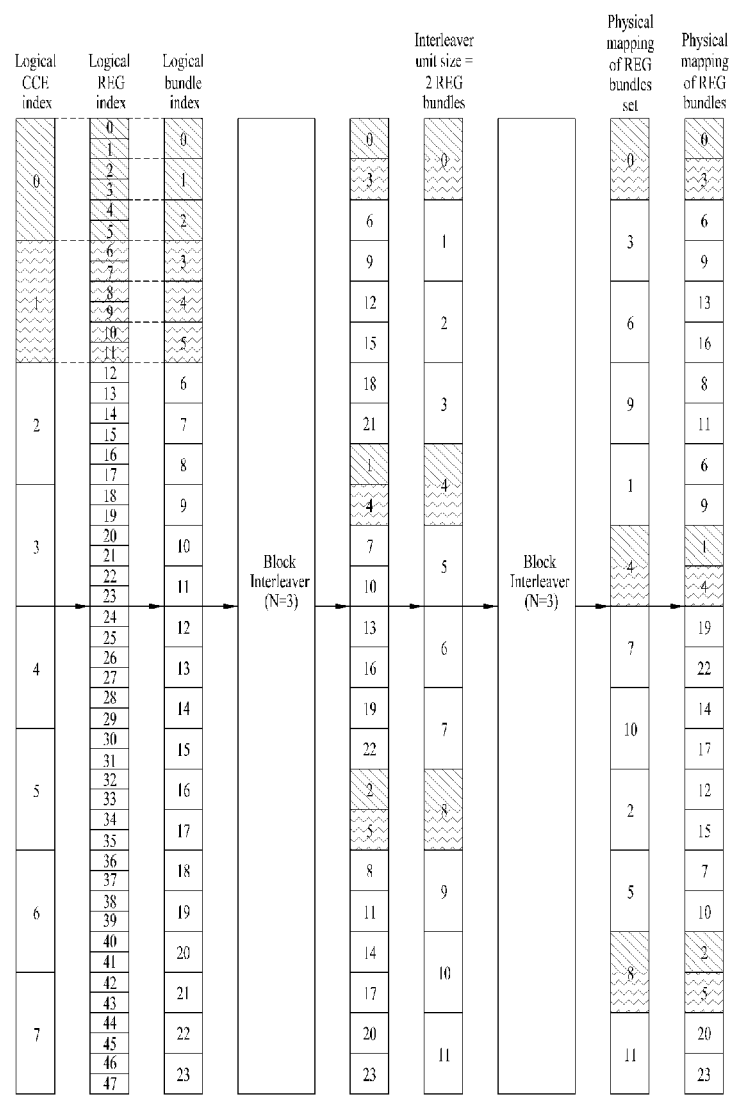
FIG. 16 illustrates interleaving using a block interleaver according to another embodiment of the present disclosure.

In FIG. 16, when a CORESET in which interleaving is performed is CORESET #1, an interleaver unit size may be set to 2 when an REG bundle size (e.g., REG bundle size for localized mapping) or an interleaver unit size (e.g., interleaver unit size for distributed mapping) of another CORESET (e.g., CORESET #2) overlapping with CORESET #1 is equal to a 2-REG bundle size in the frequency domain in CORESET #1.

To reduce signaling overhead in a 2-step approach (e.g., [Step 1: REG bundle set configuration+Step 2: interleaving] or [Step 1: first interleaving+Step 2: second interleaving]) proposed in this embodiment, an interleaver unit size of a final interleaver (e.g., interleaving of Step 2) may be fixed. For an NR PDCCH, the REG bundle size in the frequency domain may support 1, 2, 3, and 6 REGs and the fixed interleaver unit size may be determined as 6 REGs in the frequency domain so as to cover all the supported REG bundle sizes. If the interleaver unit size of the final interleaver is fixed to 6 REGs, this includes aligning an interleaving unit boundary in units of 6 REGs for all combinations of CORESETs, which has an effect of reducing blocking.

When a different duration (i.e., number of symbols) and a different REG bundle size are configured between overlapping CORESETs, an interleaver unit size of each CORESET may correspond to a different number of REG bundles. For example, in a 1-symbol CORESET with an REG bundle size of 2, the interleaver unit size may be defined as 3 REG bundles and, in a 2-symbol (or 3-symbol) CORESET with an REG bundle size of 2 (or 3), the interleaver unit size may be defined as 6 REG bundles.

Additionally, when a block interleaver (or sub-block interleaver) is applied as a final interleaver, the M or N value of the block interleaver may be fixed for randomization of block interleaver output. Alternatively, the M and/or N value of the final interleaver may be implicitly determined based on a slot or a cell ID. Since the input of Step 2 may be determined by a divisor of 6 in Step 1, the M or N value may be determined as a value (e.g., 5, 7, or 11) other than a multiple of 6.

As an example of the present disclosure, in the case of a CORESET to which interleaving is applied, a relationship between REG bundles in the logical domain may be configured through pre-processing. For example, an REG bundle set may be defined in the pre-processing step. In an interleaving step, the interleaver unit size of the corresponding CORESET may be fixed to 6 REGs in order to reduce blocking of other CORESETs overlapping the corresponding CORESET, and a sub-block interleaver of an LTE PDCCH type may be used or a block interleaver for maximally expanding the distance between REG bundles constituting each CCE may be used. In this case, parameters (e.g., M and N values of the block interleaver and the number of columns of the sub-block interleaver) required for each interleaver may use predefined values.

Hereinabove, the method for increasing frequency diversity gain while reducing the blocking probability when different CORESETs overlap has been proposed. Blocking between different CORESETs may occur for the following reasons.

Increased blocking due to different resource sizes in the frequency domain: If boundaries of resource units, such as an REG bundle, in the frequency domain are not aligned between CORESETs in the frequency domain, one resource unit belonging to a specific CORESET may block a plurality of resource units of another CORESET.

Increased blocking due to distributed mapping: Distributed mapping is used to obtain diversity gain by distributing resource units across the entire resource region using interleaving. Since sub-resource units constituting one resource unit may be distributed in distribution mapping, each sub-resource unit may block different resource units of another CORESET, resulting in an increase in blocking probability. When an AL is increased in distributed mapping, the blocking probability may greatly increase. Therefore, a method for reducing the blocking probability when the AL is increased should also be considered.

Overlap between a distributed CORESET and a localized CORESET: In the localized CORESET, each CCE consists of one REG bundle and, when an AL is 2 or more, contiguous CCEs in the frequency domain constitute one candidate. Therefore, if the localized CORESET overlaps with the distributed CORESET and multiple REG bundles constituting one CCE in the distributed CORESET are distributed over the entire distributed CORESET, the blocking probability may be increased since one REG bundle of the distributed CORESET blocks one CCE of the localized CORESET.

Overlap between CORESETs to which distributed mapping is applied: When resource distributed degrees are different in overlapping distributed CORESETs, the blocking probability may be greatly increased since each sub-resource unit of a corresponding CORESET blocks a resource unit of another CORESET.

The NR-PDCCH needs to be designed to solve this blocking issue and at the same time obtain diversity gain.

To reflect these considerations in the NR-PDCCH, REG bundle set based interleaving has been proposed. In the above embodiments, the REG bundle set may be used to align resource boundaries (in the frequency domain) between CORESETs. REG bundles belonging to the REG bundle set may be extracted from contiguous CCEs so that the blocking probability may not be significantly increased even if the AL is increased.

In addition to the various REG bundle set based interleaving methods described above, the following method may be considered. Configuration by the network below may mean configuration through higher layer signaling. For example, if a parameter is configured by the network, this may mean that the parameter is included in a CORESET configuration.

Block Interleaver for REG Bundle Rearrangement

An REG index and an REG bundle index may be determined for each CCE in the logical domain. The total REG bundles may be classified into multiple REG bundle groups.

An REG bundle group size (e.g., the number of REG bundles in a group) may be predefined or may be configured by the network.

If the REG bundle group size is predefined, the REG bundle group size may be the number of CCEs (which are contiguous in the logical domain). For example, when 2 CCEs are predefined as the REG bundle group size, REG bundles included in the two contiguous CCEs may form one REG bundle group. The number of REG bundles belonging to each REG bundle group may be defined as (6/REG bundle size)*(number of CCEs in an REG bundle group).

When the REG bundle group size is configured by the network, the number of CCEs or the number of (contiguous) REG bundles, corresponding to the REG bundle group size, may be configured as the REG bundle group size.

REG bundles belonging to each REG bundle group may be permutated by a block interleaver. The block interleaver may have an M×N matrix and the N value (e.g., number of columns) of the block interleaver may be predefined or may be configured by a network. The N value may be determined as the number of REG bundles per CCE in a corresponding CORESET or a multiple (including ×1) of the number of REG bundles per CCE.

The block interleaver serves to contiguously arrange REGs belonging to different CCEs in the REG bundle group. When the AL increases, the block interleaver may be used to configure one candidate as (partially) contiguous REG bundles. This may be used as a method to reduce the blocking probability due to distributed mapping.

An interleaving unit of the block interleaver may be defined as an REG bundle.

Sub Block Interleaver (or Second Block Interleaver) for Distribution of REG Bundle Sets In order to distribute rearranged REG bundles in the CORESET region as a result of block interleaving, the rearranged REG bundles may be permutated by a sub-block interleaver (or a second block interleaver).

The interleaving unit size of the sub-block interleaver may be predefined or may be configured by the network. When the interleaving unit size of the sub-block interleaver is predefined, an input size (e.g., number of CCEs) of the block interleaver may be used as the interleaving unit size of the sub-block interleaver. For example, if the REG bundle group size for the block interleaver is 2 CCEs, the interleaving unit size of the sub-block interleaver may be determined as 2 REG bundles. In this way, the unit is changed from a CCE to an REG bundle. When the interleaving unit size of the sub-block interleaver is configured by the network, the interleaving unit size of the sub-block interleaver may be a multiple (including ×1) of the REG bundle group size of the block interleaver.

When the second block interleaver is used instead of the sub-block interleaver, the N value of the second block interleaver may be predefined or may be configured by the network.

If the interleaver unit size is predefined or is configured by the network, this may mean that the interleaver matrix size or the size of interleaver input is the same between overlapping CORESETs, thereby reducing blocking by equally configuring distributed degrees in overlap between two CORESETs to which distributed mapping is applied.

Figure 17A:
FIG. 17a illustrates interleaving of a 2-symbol CORESET according to an embodiment of the present disclosure.
Figure 17B:
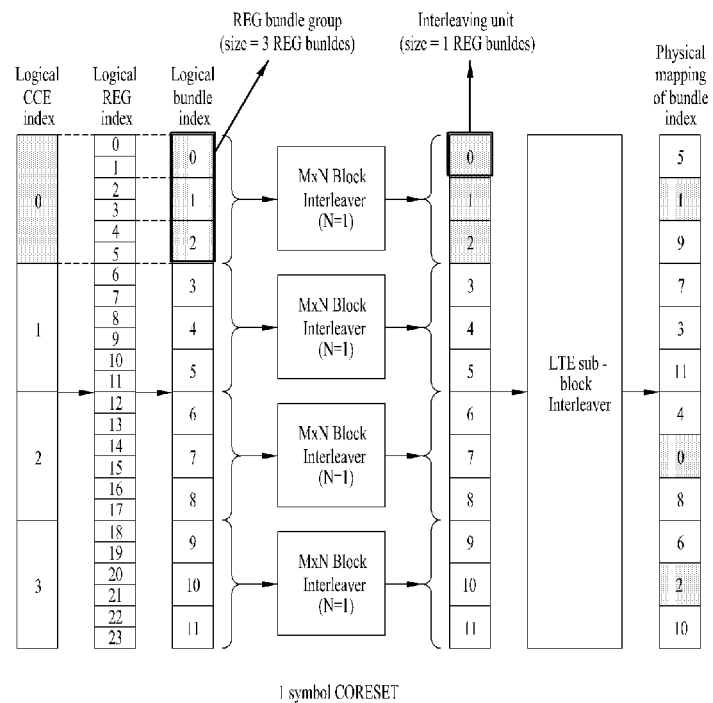
FIG. 17b illustrates interleaving of a 1-symbol CORESET according to an embodiment of the present disclosure.
Figure 17C:
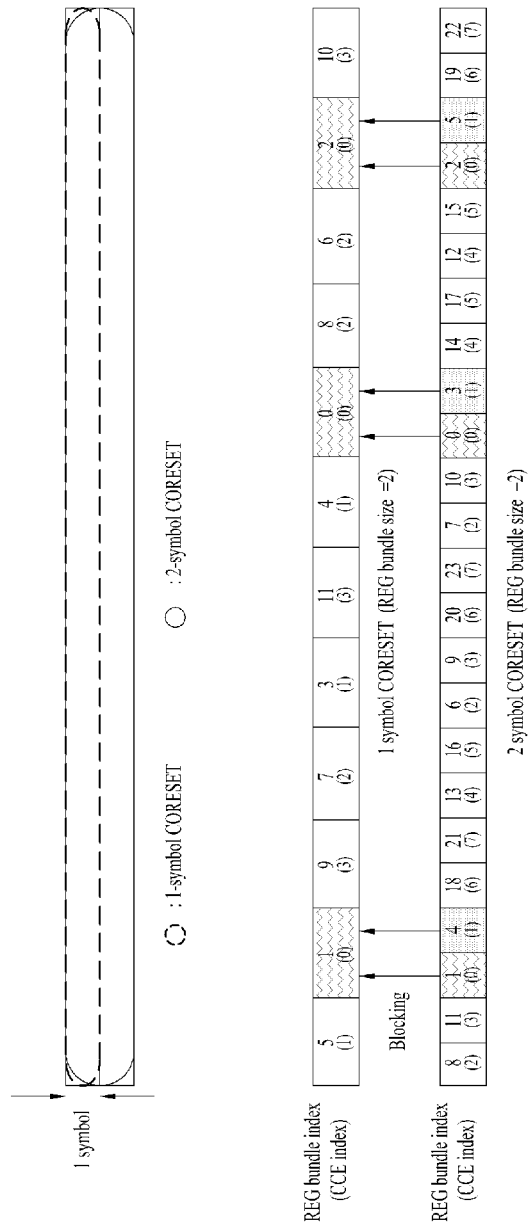
FIG. 17c illustrates blocking of a 2-symbol CORESET and a 1-symbol CORESET according to an embodiment of the present disclosure.

FIG. 17a illustrates interleaving of a 2-symbol CORESET, FIG. 17b illustrates interleaving of a 1-symbol CORESET, and FIG. 17c illustrates blocking of the 2-symbol CORESET of FIG. 17a and the 1-symbol CORESET of FIG. 17b. In FIGS. 17a to 17c, it is assumed that a 1-symbol CORESET having an REG bundle size of 2 REGs and a 2-symbol CORESET having an REG bundle size of 2 fully overlap in a 1-symbol CORESET region and the bandwidth of each CORESET is 24 RBs.

Referring to FIG. 17a, an REG bundle group size of the 2-symbol CORESET, an N value of a block interleaver, and an interleaving unit size of a sub-block interleaver may be predefined or configured as 2 CCEs, 3, and 2 REG bundles, respectively.

Referring to FIG. 17b, an REG bundle group size of the 1-symbol CORESET, an N value, and an interleaving unit size of a sub-block interleaver may be predefined or configured as 1 CCE, 1, and 1 REG bundle, respectively. The REG bundle group size may be set to 3 REG bundles or 1 REG bundle. If the REG bundle group size is 1, the N value may be any value.

Referring back to FIG. 17a, sequential REG bundle arrangement according to indexes in the 2-symbol CORE- SET is changed to arrangement of REG bundles belonging to different CCEs in an REG bundle group by REG bundle grouping and a block interleaver. This serves to reduce blocking caused by an AL-2 candidate in the 2-symbol CORESET.

In addition, the network may configure an interleaving unit size of the 2-symbol CORESET as 2 REG bundles, so that a sub-block interleaver input size of the 1-symbol CORESET and the interleaving unit size of the 2-symbol CORESET may be equally configured. This serves to align frequency domain resources occupied by an AL-2 candidate of the 2-symbol CORESET and frequency domain resources occupied by an AL-1 candidate of the 1-symbol CORESET.

As a result, as illustrated in FIG. 17c, the number of CCEs of the 1-symbol CORESET blocked by each of AL-1 and AL-2 candidates of the 2-symbol CORESET is equal.

According to the present embodiment, even when CORESETs having REG bundle sizes of 1 and 2 overlap in the frequency domain, the same result as in FIG. 17c is obtained. However, the N value of the block interleaver may be changed based on a CORESET duration. For example, if 3-symbol CORESETs with REG bundle sizes of 3 and 6 fully overlap, the REG bundle group size of the CORESET having the REG bundle size of 6, the N value of the block interleaver, and the interleaving unit size of the sub-block interleaver may be predefined or may be configured by the network as 2 CCEs (=2 REG bundles), 2, and 2 REG bundles, respectively.

In addition, when the network/UE configures an REG bundle group, CCE indexes forming each group may be 2n or 2n+1. In this case, the range of the n value may be predefined or may be configured by the network (e.g., {0,1} or {0,1,2}). Such a method may be considered for frequency diversity gain for an AL-2 candidate. In this case, the number of CCEs of a victim CORESET blocked by the AL-2 candidate of an aggressor CORESET may be increased. However, frequency diversity gain for the AL-2 candidate may be improved and the block probability of an AL-4 candidate may be reduced since the number of CCEs blocked by the AL-4 candidates and the number of CCEs blocked by the AL-2 candidate are equal.

To cover more cases, an AL set (e.g., {1, 2, 4, 8} or {1, 3, 6, 12}) may be configured for each CORESET. For example, when CORESETs having REG bundle sizes of 1 and 3 overlap in the frequency domain occurs, blocking may be more effectively reduced when the AL set of {1, 3, 6, 12} is applied to the CORESET having the REG bundle size of 1.

As described above, while the network/BS transmitting the PDCCH may perform interleaving, the UE may also perform interleaving in a process of blind-detecting the PDCCH. Interleaving performed by the UE for PDCCH reception may be referred to as de-interleaving. If the UE performs blind detection on the PDCCH on the assumption that the BS performs interleaving on the PDCCH in a specific manner, this may be understood as the UE performing de-interleaving corresponding to specific interleaving performed by the BS. For example, it is assumed that CCE #0 and CCE #1 constituting an AL-2 candidate are present and, as a result of performing interleaving by the network during CCE-to-REG mapping, CCE #0 includes REG bundles A and C and CCE #1 includes REG bundles B and D. When the UE performs blind detection on the AL 2 candidate, the UE may configure CCE #0 through REG bundles A and C and CCE #1 through REG bundles B and D by performing de-interleaving on 4 REG bundles A, B, C, and D.

Figure 18:
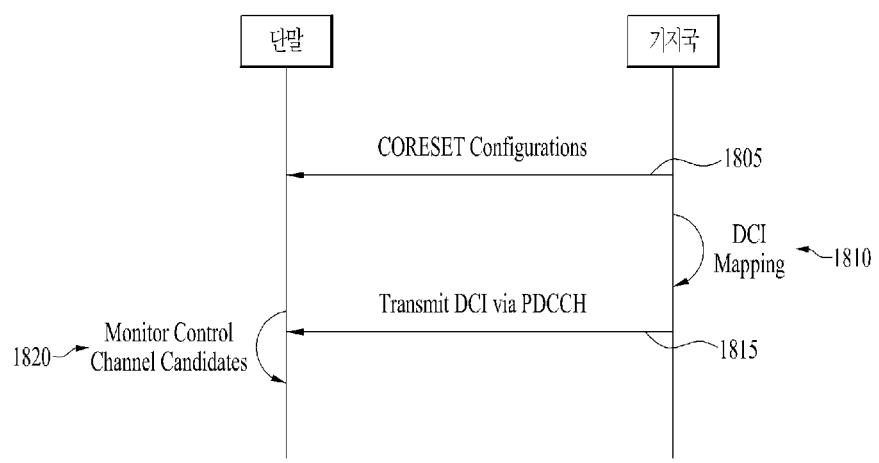
FIG. 18 is a flowchart for a method of transmitting/receiving a downlink signal according to one embodiment of the present disclosure.

FIG. 18 is a flowchart illustrating a method of transmitting and receiving a downlink signal according to an embodiment of the present disclosure. FIG. 18 is an exemplary implementation of the above-described embodiments and a repetitive description may be omitted.

Referring to FIG. 18, a BS transmits configuration information regarding each of a plurality of CORESETs to a UE (1805).

The BS maps DCI to a resource (1810). Since resources should be determined to map the DCI, the mapping process of the DCI may include CCE-to-REG mapping. For example, the BS may map each CCE of a control channel candidate to at least one REG bundle by performing interleaving on a first CORESET among the plural CORESETs. If the first CORESET on which interleaving is performed overlaps with a second CORESET among the plural CORESETs and an AL of the control channel candidate is 2 or more, the BS may perform interleaving such that at least one REG bundle of a first CCE among different CCEs constituting the control channel candidate and at least one REG bundle of a second CCE among the different CCEs may be contiguous in the frequency domain.

The BS transmits the DCI to the UE (1815). For example, the BS may transmit the DCI of the UE on the control channel candidate based on mapping between each CCE and at least one REG bundle.

The UE monitors the control channel candidate on the plural CORESETs configured by the BS (1820). Blind detection for the control channel candidate may be used as a method of monitoring the control channel candidate. The blind detection process may include CCE-to-REG mapping because resources constituting the control channel candidate should be determined for blind detection. For example, the UE may perform interleaving on the first CORESET among the plural CORESETs to map each CCE of the control channel candidate to at least one REG bundle and, based on the mapping between each CCE and the at least one REG bundle, the UE may attempt to detect the DCI thereof from the control channel candidate. If the first CORESET on which interleaving is performed overlaps with the second CORESET among the plural CORESETs and the AL of the control channel candidate is 2 or more, the UE may perform interleaving such that at least one REG bundle of the first CCCE among different CCEs constituting the control channel candidate and at least one REG bundle of the second CCE may be contiguous in the frequency domain.

After grouping different CCEs into a plurality of CCE groups, the UE/BS may perform REG bundle level interleaving for each CCE group and perform comb-combining of alternately combining a result of REG bundle level interleaving with respect to the CCE groups. For example, the first CCE and the second CCE may belong to different CCE groups and REG bundle level interleaving may be performed through a sub-block interleaver. In addition, the number of the plural CCE groups may be included in the configuration information regarding the first CORESET or may be determined based on ALs configured in the first CORESET.

The UE/BS may group REG bundles included in the first CORESET into a plurality of REG bundle sets and then interleave the plural REG bundle sets at an REG bundle set level The size of one REG bundle set may be included in the configuration information regarding the first CORESET or may be determined based on the ALs configured in the first CORESET.

The UE/BS may extract all REG bundles included in one REG bundle set only from even-numbered CCEs or only from odd-numbered CCEs.

The UE/BS may perform interleaving through two block interleavers connected serially. A first block interleaver of the two block interleavers may interleave the REG bundles included in the first CORESET to output the plural REG bundle sets and a second block interleaver of the two block interleavers may interleave the plural REG bundle sets at the REG bundle set level.

The UE/BS may divide the first CORESET into a plurality of sub-CORESETs and perform interleaving for each sub-CORESET.

The configuration information regarding each of the plural CORESETs may further include information about an AL set to be applied to a corresponding CORESET and one of AL sets {1, 2, 4, 8}, {1, 2, 4, 8, 16}, {1, 3, 6, 12}, and {1, 3, 6, 12, 24} may be configured for the first CORESET. Here, the AL set may mean an AL set that may be monitored in a corresponding CORESET and ALs that the UE actually monitors may be configured in a corresponding AL set by a search space set configuration.

Figure 19:
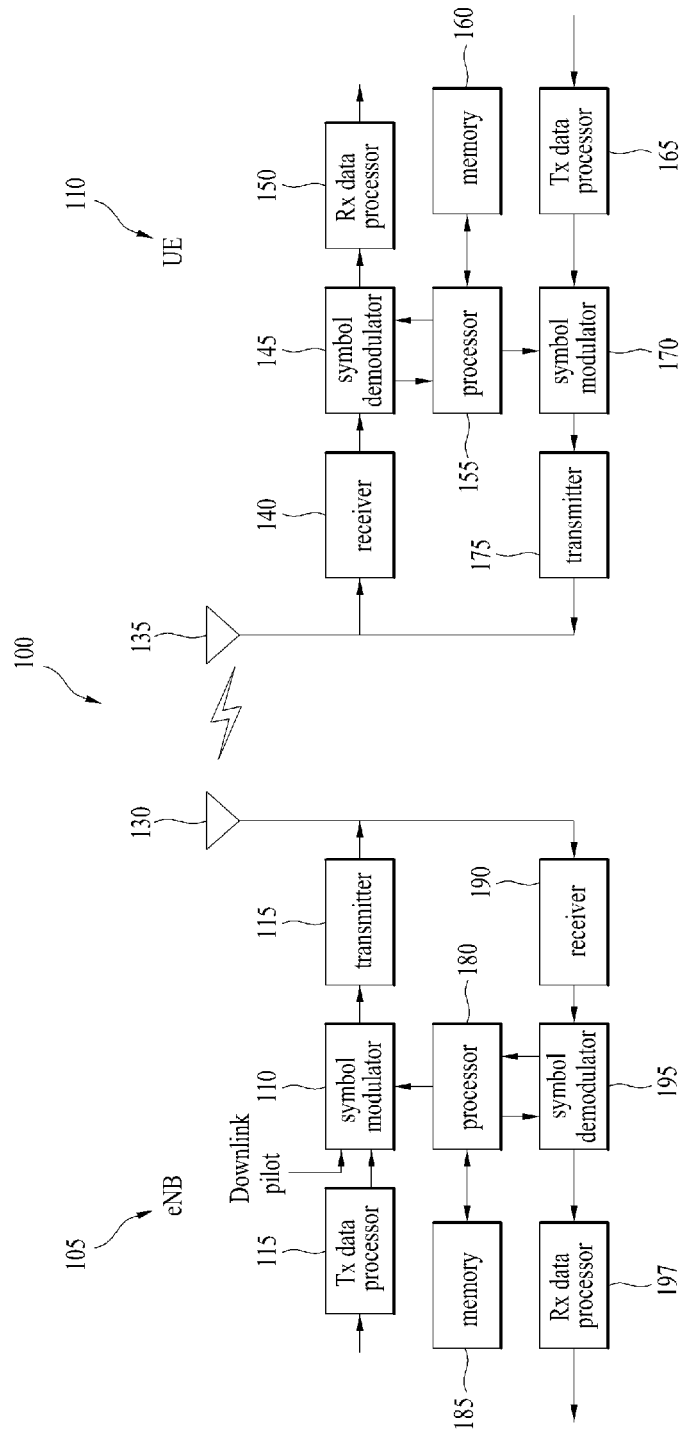
FIG. 19 illustrates a user equipment and a base station according to one embodiment of the present disclosure.

FIG. 19 is a block diagram illustrating a structure of a base station (BS) 105 and a UE 110 in a wireless communication system 100 according to an embodiment of the present disclosure. The structure of the BS 105 and the UE 110 of FIG. 19 are merely an embodiment of a BS and a UE for implementing the aforementioned method and the structure of a BS and a UE according to the present disclosure is not limited to FIG. 19. The BS 105 may also be referred to as an eNB or a gNB. The UE 110 may also be referred to as a user terminal.

Although one BS 105 and one UE 110 are illustrated for simplifying the wireless communication system 100, the wireless communication system 100 may include one or more BSs and/or one or more UEs.

The BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and an Rx data processor 150. In FIG. 12, although one antenna 130 is used for the BS 105 and one antenna 135 is used for the UE 110, each of the BS 105 and the UE 110 may also include a plurality of antennas as necessary. Therefore, the BS 105 and the UE 110 according to the present disclosure support a Multiple Input Multiple Output (MIMO) system. The BS 105 according to the present disclosure may support both a Single User-MIMO (SU-MIMO) scheme and a Multi User-MIMO (MU-MIMO) scheme.

In downlink, the Tx data processor 115 receives traffic data, formats the received traffic data, codes the formatted traffic data, interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a Time Division Multiplexing (TDM) symbol, or a Code Division Multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the UE through the antenna 130.

Configuration of the UE 110 will hereinafter be described in detail. The antenna 135 of the UE 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the BS 205.

The Tx data processor 165 of the UE 110 processes traffic data in uplink, and provides data symbols. The symbol modulator 170 receives and multiplexes data symbols, and modulates the multiplexed data symbols, such that it may provide a stream of symbols to the transmitter 175. The transmitter 175 obtains and processes the stream of symbols to generate an uplink (UL) signal, and the UL signal is transmitted to the BS 105 through the antenna 135. The transmitter and the receiver of UE/BS may be implemented as a single radio frequency (RF) unit.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink. The Rx data processor 197 processes the data symbol estimation value, and recovers traffic data received from the UE 110.

A processor 155 or 180 of the UE 110 or the BS 105 commands or indicates operations of the UE 110 or the BS 105. For example, the processor 155 or 180 of the UE 110 or the BS 105 controls, adjusts, and manages operations of the UE 210 or the BS 105. Each processor 155 or 180 may be connected to a memory unit 160 or 185 for storing program code and data. The memory 160 or 185 is connected to the processor 155 or 180, such that it may store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present disclosure may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present disclosure may be implemented in the form of modules, procedures, functions, etc. which perform the above-described functions or operations. Firmware or software implemented in the present disclosure may be contained in the processor 155 or 180 or the memory unit 160 or 185, such that it may be driven by the processor 155 or 180.

Radio interface protocol layers among the UE 110, the BS 105, and a wireless communication system (i.e., network) may be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The UE 110 and the BS 105 may exchange RRC messages with each other through the wireless communication network and the RRC layer.

The above-mentioned embodiments correspond to combinations of elements and features of the present disclosure in prescribed forms. And, it is able to consider that the respective elements or features are selective unless they are explicitly mentioned. Each of the elements or features may be implemented in a form failing to be combined with other elements or features. Moreover, it is able to implement an embodiment of the present disclosure by combining elements and/or features together in part. A sequence of operations explained for each embodiment of the present disclosure may be modified. Some configurations or features of one embodiment may be included in another embodiment or may be substituted for corresponding configurations or features of another embodiment. And, it is apparently understandable that an embodiment is configured by combining claims failing to have relation of explicit citation in the appended claims together or may be included as new claims by amendment after filing an application.

While the present disclosure has been described and illustrated herein with reference to the preferred embodiments thereof, it will be apparent to those skilled in the art that various modifications and variations may be made therein without departing from the spirit and scope of the disclosure. Thus, it is intended that the present disclosure covers the modifications and variations of this disclosure that come within the scope of the appended claims and their equivalents.

INDUSTRIAL APPLICABILITY

As described above, the present disclosure may be applied to various wireless communication systems.

The invention claimed is:

1. A method of receiving a downlink signal by a user equipment (UE) in a wireless communication system, the method comprising:

receiving configuration information regarding each of a plurality of control resource sets (CORESETs) from a base station (BS);

mapping each control channel element (CCE) of a control channel candidate to at least one resource element group (REG) bundle by performing interleaving on a first CORESET among the plural CORESETs; and attempting to detect downlink control information of the UE from the control channel candidate based on mapping between each CCE and the at least one REG bundle, wherein, based on overlap between the first CORESET on which interleaving is performed and a second CORESET among the plural CORESETs and an aggregation level of the control channel candidate greater than 2 or more, the UE performs interleaving to cause at least one REG bundle of a first CCE among different CCEs constituting the control channel candidate and at least one REG bundle of a second CCE among the different CCEs to be contiguous in the frequency domain.

2. The method of claim 1, wherein the UE
groups the different CCEs into a plurality of CCE groups and then performs REG bundle level interleaving for each of the plural CCE groups, and
performs comb-combining of alternately combining a result of the REG bundle level interleaving with respect to the CCE groups.

3. The method of claim 2,
wherein the first CCE and the second CCE belong to different CCE groups, and
the REG bundle level interleaving is performed through a sub-block interleaver.

4. The method of claim 2,
wherein the number of the plural CCE groups is included in configuration information regarding the first CORESET or is determined based on aggregation levels configured for the first CORESET.

5. The method of claim 1, wherein the UE groups REG bundles included in the first CORESET into a plurality of REG bundle sets and then interleaves the plural REG bundle sets at an REG bundle set level.

6. The method of claim 5, wherein the size of one REG bundle set is included in configuration information regarding the first CORESET or is determined based on aggregation levels configured for the first CORESET.

7. The method of claim 5, wherein the UE extracts all REG bundles included in one REG bundle set only from even-numbered CCEs or only from odd-numbered CCEs.

8. The method of claim 5,
wherein the UE performs interleaving through two block interleavers connected serially,
a first block interleaver of the two block interleavers interleaves the REG bundles included in the first CORESET to output the plural REG bundle sets, and
a second block interleaver interleaves the plural REG bundle sets at the REG bundle set level.

9. The method of claim 1,
wherein the UE divides the first CORESET into a plurality of sub-CORESETs and performs interleaving for each of the plural sub-CORESETs.

10. The method of claim 1, wherein the configuration information regarding each of the plural CORESETs further includes information about an aggregation level set to be applied to a corresponding CORESET, and one of aggregation level sets {1, 2, 4, 8}, {1, 2, 4, 8, 16}, {1, 3, 6, 12}, and {1, 3, 6, 12, 24} is configured for the first CORESET.

11. A method of transmitting a downlink signal by a base station (BS) in a wireless communication system, the method comprising:
- transmitting configuration information regarding each of a plurality of control resource sets (CORESETs) to a user equipment (UE);
- mapping each control channel element (CCE) of a control channel candidate to at least one resource element group (REG) bundle by performing interleaving on a first CORESET among the plural CORESETs; and
- transmitting downlink control information of the UE on the control channel candidate based on mapping between each CCE and the at least one REG bundle,
- wherein, based on overlap between the first CORESET on which interleaving is performed and a second CORESET among the plural CORESETs and an aggregation level of the control channel candidate greater than 2 or more, the BS performs interleaving to cause at least one REG bundle of a first CCE among different CCEs constituting the control channel candidate and at least one REG bundle of a second CCE among the different CCEs to be contiguous in the frequency domain.

12. The method of claim 11, wherein the BS
- groups the different CCEs into a plurality of CCE groups and then performs REG bundle level interleaving for each of the plural CCE groups, and
- performs comb-combining of alternately combining a result of the REG bundle level interleaving with respect to the CCE groups.

13. The method of claim 11, wherein the BS groups REG bundles included in the first CORESET into a plurality of REG bundle sets and then interleaves the plural REG bundle sets at an REG bundle set level.

14. The method of claim 11,
- wherein the BS divides the first CORESET into a plurality of sub-CORESETs and performs interleaving for each sub-CORESET.

15. The method of claim 11, wherein the configuration information regarding each of the plural CORESETs further includes information about an aggregation level set to be applied to a corresponding CORESET, and one of aggregation level sets {1, 2, 4, 8}, {1, 2, 4, 8, 16}, {1, 3, 6, 12}, and {1, 3, 6, 12, 24} is configured for the first CORESET.

16. A user equipment (UE) for receiving a downlink signal, comprising:
- a transceiver; and
- a processor configured to receive configuration information regarding each of a plurality of control resource sets (CORESETs) from a base station (BS) through the transceiver, map each control channel element (CCE) of a control channel candidate to at least one resource element group (REG) bundle by performing interleaving on a first CORESET among the plural CORESETs, and attempt to detect downlink control information of the UE from the control channel candidate based on mapping between each CCE and the at least one REG bundle,
- wherein, based on overlap between the first CORESET on which interleaving is performed and a second CORESET among the plural CORESETs and an aggregation level of the control channel candidate greater than 2 or more, the processor performs interleaving to cause at least one REG bundle of a first CCE among different CCEs constituting the control channel candidate and at least one REG bundle of a second CCE among the different CCEs to be contiguous in the frequency domain.

17. The UE according to claim 16, wherein the UE is capable of communicating with at least one of another UE, a UE related to an autonomous driving vehicle, a base station or a network.

* * * * *